US012604326B2

(12) United States Patent
Bang et al.

(10) Patent No.: US 12,604,326 B2
(45) Date of Patent: Apr. 14, 2026

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Jonghyun Bang, Suwon-si (KR); Youngbum Kim, Suwon-si (KR); Taehyoung Kim, Suwon-si (KR); Jinhyun Park, Suwon-si (KR); Jinyoung Oh, Suwon-si (KR); Jinkyu Kang, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 17/914,960

(22) PCT Filed: Mar. 29, 2021

(86) PCT No.: PCT/KR2021/003857
§ 371 (c)(1),
(2) Date: Sep. 27, 2022

(87) PCT Pub. No.: WO2021/201533
PCT Pub. Date: Oct. 7, 2021

(65) Prior Publication Data
US 2023/0217458 A1     Jul. 6, 2023

(30) Foreign Application Priority Data
Mar. 31, 2020     (KR) ........................ 10-2020-0039436

(51) Int. Cl.
*H04W 72/232* (2023.01)
*H04W 72/231* (2023.01)

(52) U.S. Cl.
CPC ....... *H04W 72/232* (2023.01); *H04W 72/231* (2023.01)

(58) Field of Classification Search
CPC .......................... H04W 72/232; H04W 72/231
(Continued)

(56) References Cited

U.S. PATENT DOCUMENTS

2016/0227425 A1     8/2016   Kim et al.
2016/0234841 A1     8/2016   Pao et al.
(Continued)

OTHER PUBLICATIONS

LG Electronics, 'Feature lead summary#4 of Enhancements on Multi-beam Operations', R1-1911561, 3GPP TSG RAN WG1 Meeting #98bis, Chongqing, China, Oct. 22, 2019.
(Continued)

*Primary Examiner* — Michael Thier
(74) *Attorney, Agent, or Firm* — Jefferson IP Law, LLP

(57) ABSTRACT

The disclosure relates to a method and apparatus for transmitting and receiving downlink control information in a wireless communication system. According to an embodiment of the disclosure, a terminal may transmit, to a base station, capability information indicating that the terminal supports scheduling of a plurality of cells, may receive, from the base station, downlink control information (DCI) including information about a plurality of cells that are scheduled, may identify the scheduled plurality of cells based on the received DCI, and may perform downlink (DL) reception or uplink (UL) transmission through at least one of the identified plurality of cells.

9 Claims, 13 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 2017/0374653 | A1* | 12/2017 | Lee ........................... | H04L 1/00 |
| 2018/0254876 | A1* | 9/2018 | Dinan ............... | H04W 52/0235 |
| 2019/0313429 | A1 | 10/2019 | Cheng | |
| 2021/0266139 | A1* | 8/2021 | Takeda ................. | H04L 5/0078 |
| 2021/0314997 | A1* | 10/2021 | Seo ....................... | H04L 5/0053 |
| 2022/0191892 | A1* | 6/2022 | Muruganathan ..... | H04B 7/0695 |

OTHER PUBLICATIONS

Huawei etc., 'Feature Summary of Enhancements on Multi-TRP/ Panel Transmission', R1-1913299, 3GPP TSG RAN WG1 Meeting #99, Reno, USA, Nov. 25, 2019.
International Search Report and Written Opinion dated Jun. 25, 2021, issued in International Patent Application No. PCT/KR2021/ 003857.
Korean Office Action with English translation dated May 14, 2025; Korean Appln. No. 10-2020-0039436.

* cited by examiner

FIG. 6
RRC configured TCI states per CORESET
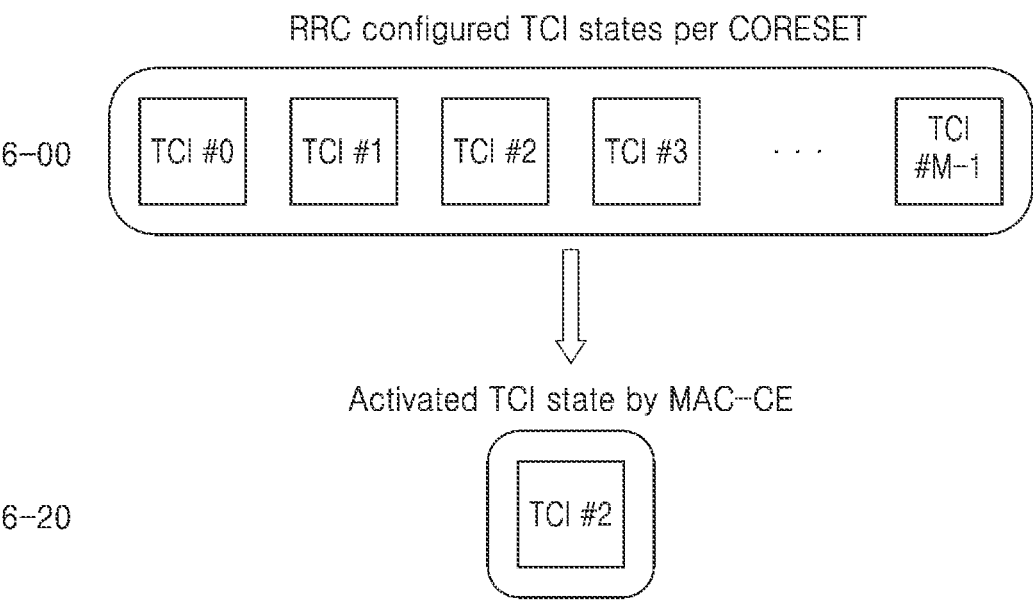
Activated TCI state by MAC-CE
MAC-CE structure
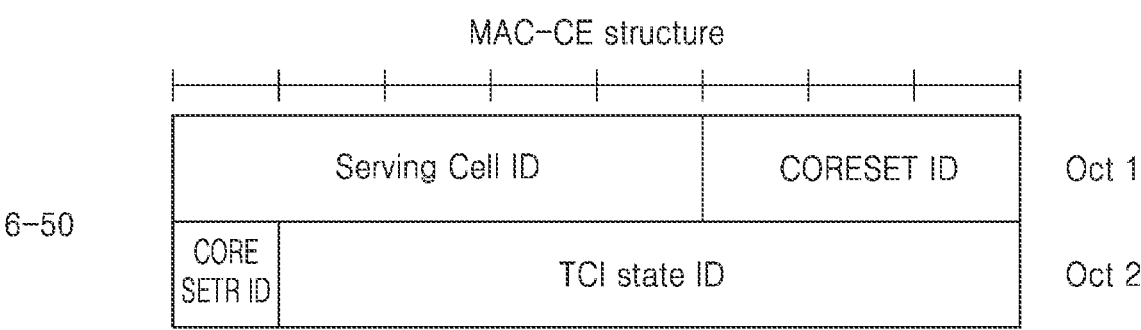

FIG. 7

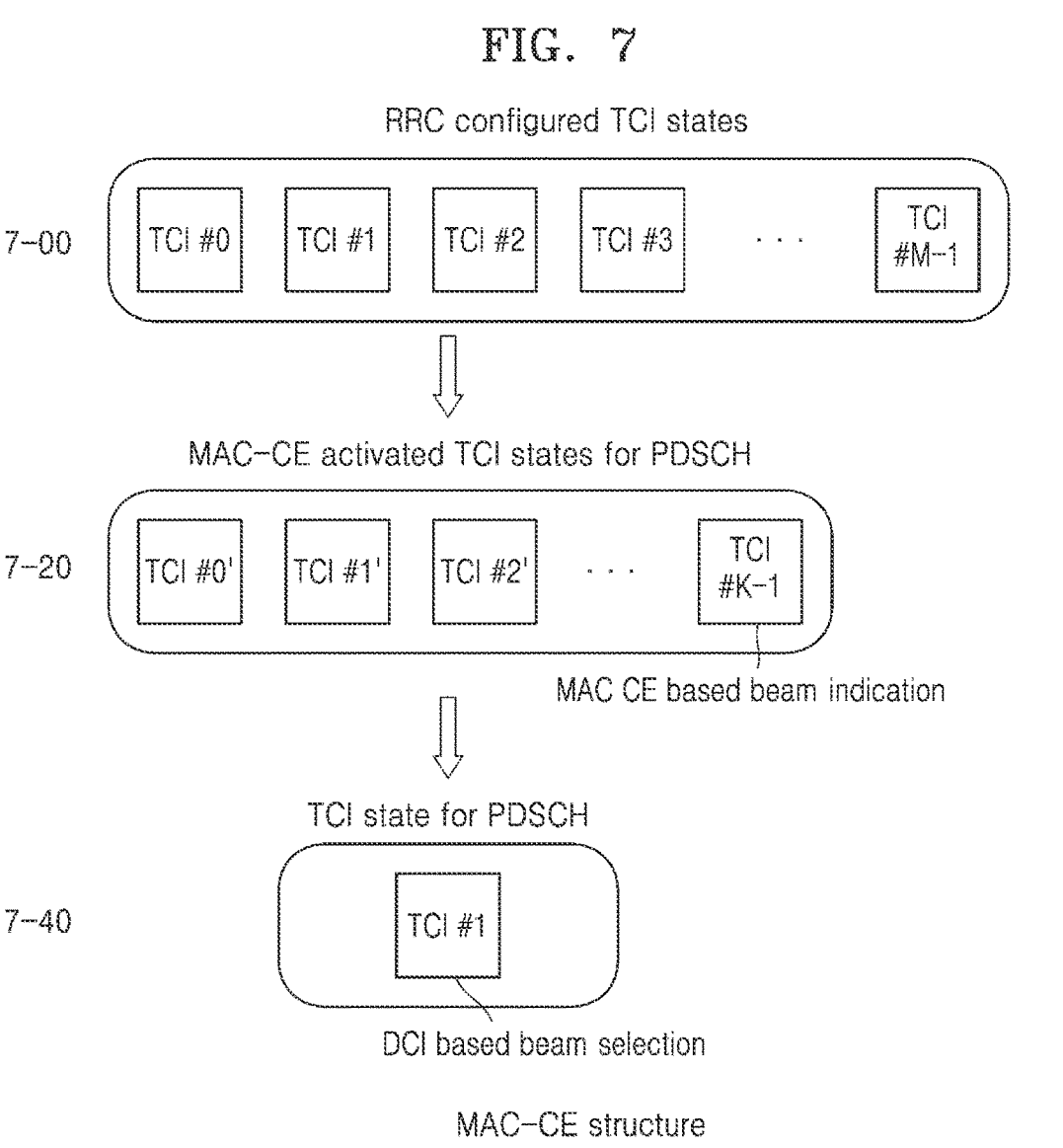

RRC configured TCI states 7-00

| TCI #0 | TCI #1 | TCI #2 | TCI #3 | · · · | TCI #M-1 |

MAC-CE activated TCI states for PDSCH 7-20

| TCI #0' | TCI #1' | TCI #2' | · · · | TCI #K-1 |

MAC CE based beam indication

TCI state for PDSCH 7-40

| TCI #1 |

DCI based beam selection

MAC-CE structure 7-50

| R | Serving Cell ID | | BWP ID | | Oct 1 |
|---|---|---|---|---|---|
| T7 | T6 | T5 | T4 | T3 | T2 | T1 | T0 | Oct 2 |
| T15 | T14 | T13 | T12 | T11 | T10 | T9 | T8 | Oct 2 |

.
.
.

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

METHOD AND APPARATUS FOR PERFORMING COMMUNICATION IN WIRELESS COMMUNICATION SYSTEM

TECHNICAL FIELD

The disclosure relates to a method and apparatus for transmitting and receiving downlink control information in a wireless communication system. More particularly, the disclosure relates to a method of determining and interpreting control information included in downlink control information at a system and node for transmitting an uplink signal or a system and node for receiving a downlink signal in a plurality of cells.

BACKGROUND ART

To meet significantly increasing demand with respect to wireless data traffic due to the commercialization of 4th generation (4G) communication systems and the increase in multimedia services, evolved 5th generation (5G) system or pre-5G communication system are developed. For this reason, 5G or pre-5G communication systems are called beyond 4G network communication systems or post long-term evolution (post-LTE) systems.

In order to increase a data rate, consideration is given to implementing 5G communication systems in ultra-high frequency bands (millimeter wave (mmW)) (e.g., 60 GHz). In order to reduce pathloss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied.

Also, in order to improve system networks, for 5G communication systems, technologies such as evolved small cell, advanced small cell, cloud radio access network (cloud RAN), ultra-dense network, device-to-device (D2D) communication, wireless backhaul, moving network, cooperative communication, coordinated multi-points (COMP), and received-interference cancellation have been developed. Also, for 5G communication systems, advanced coding modulation (ACM) schemes such as hybrid frequency-shift keying (FSK) and quadrature amplitude modulation (QAM) modulation (FQAM) and sliding window superposition coding (SWSC) and enhanced network access schemes such as filter-bank multi-carrier (FBMC), non-orthogonal multiple access (NOMA), and sparse code multiple access (SCMA) have been developed.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In an IoT environment, intelligent Internet technology (IT) services that collect and analyze data generated by connected objects and create new value in human life may be provided. IoT may be applied to a variety of areas, such as smart homes, smart buildings, smart cities, smart cars or connected cars, smart grid, health care, smart home appliances, and advanced medical services through convergence and combination between existing Information Technologies (IT) and various industrial applications.

Accordingly, various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

As various services may be provided with the development of wireless communication systems as described above, there is a demand for a method of seamlessly providing the various services.

Description of Embodiments

Technical Problem

The disclosure relates to a method and apparatus for transmitting and receiving a downlink control channel in a wireless communication system. According to an embodiment of the disclosure, there is provided a method of determining downlink control information included in a downlink control channel, at a system and node for transmitting an uplink signal or a system or node of receiving a downlink signal in a plurality of cells.

Solution to Problem

The disclosure relates to a method and apparatus for transmitting and receiving downlink control information in a wireless communication system. According to an embodiment of the disclosure, a terminal may transmit, to a base station, capability information indicating that the terminal supports scheduling of a plurality of cells, receive, from the base station, downlink control information (DCI) including information about a plurality of cells that are scheduled, identify the scheduled plurality of cells based on the received DCI, and perform downlink (DL) reception or uplink (UL) transmission through at least one of the identified plurality of cells.

Advantageous Effects of Disclosure

According to an embodiment of the disclosure, uplink data transmission and downlink data reception efficiency may be improved through a method of identifying control information included in a downlink control channel at a system and node for receiving a downlink signal or a system and node for transmitting an uplink signal in a wireless communication system.

BRIEF DESCRIPTION OF THE DRAWINGS

FIG. 6 is a diagram illustrating a process of configuring and activating a beam of a physical downlink control channel (PDCCH), according to an embodiment of the disclosure.

FIG. 7 is a diagram illustrating a process of configuring and activating a beam of a physical downlink shared channel (PDSCH), according to an embodiment of the disclosure.

BEST MODE

Figure 1:
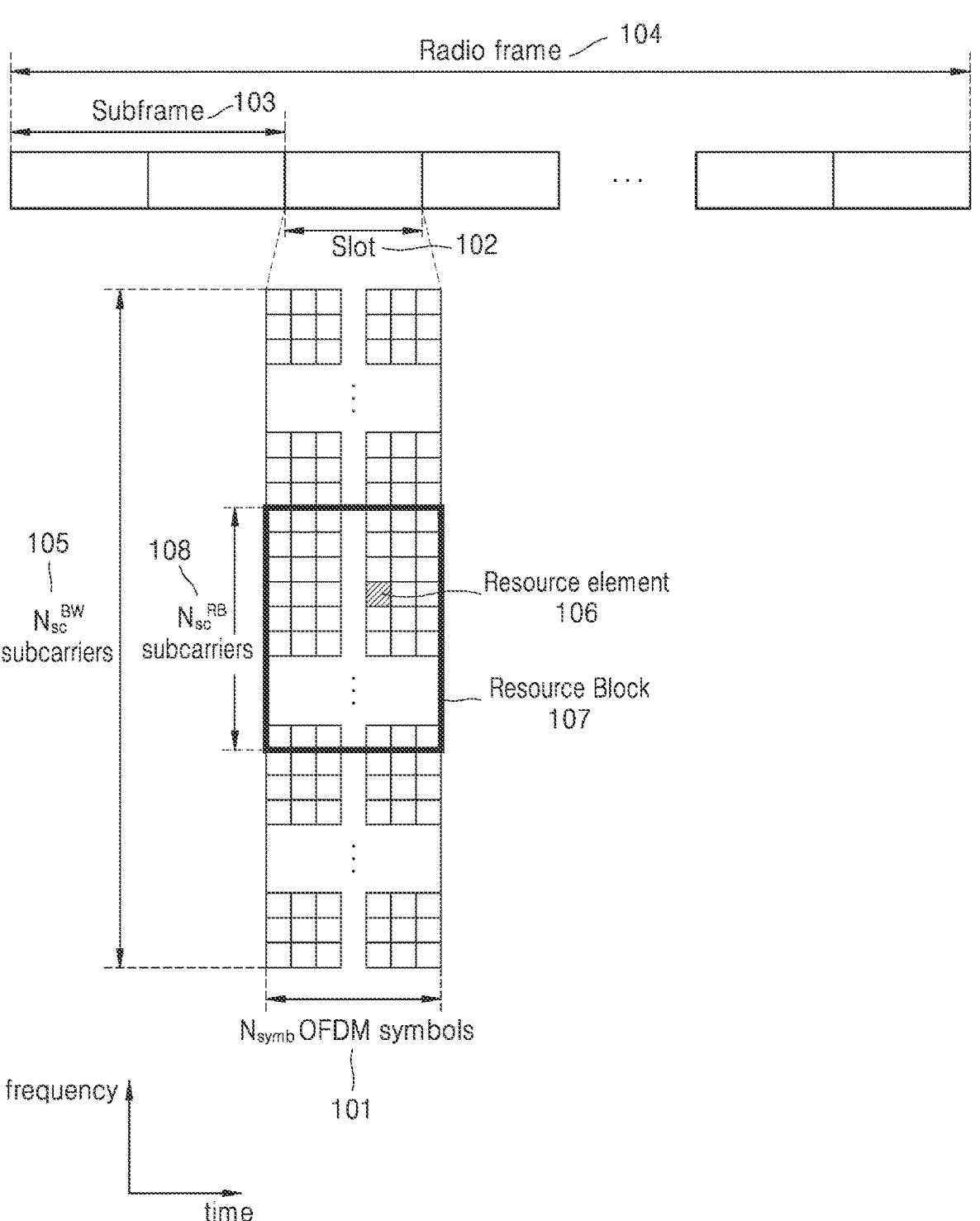
FIG. 1 is a diagram illustrating an uplink/downlink time-frequency domain transmission structure of a new radio (NR) system.

A method by which a terminal performs communication in a wireless communication system according to an embodiment of the disclosure may include: transmitting, to a base station, capability information indicating that the terminal supports scheduling of a plurality of cells; receiving, from the base station, downlink control information (DCI) including information about a plurality of cells that are scheduled; identifying the scheduled plurality of cells based on the received DCI; and performing downlink (DL) reception or uplink (UL) transmission through at least one of the identified plurality of cells.

A method by which a base station performs communication in a wireless communication system according to an embodiment of the disclosure may include: receiving, from a terminal, capability information indicating that the terminal supports scheduling of a plurality of cells; scheduling a plurality of cells for the terminal; transmitting downlink control information (DCI) including information about the scheduled plurality of cells; and when the scheduled plurality of cells are identified based on the received DCI, performing downlink (DL) transmission or uplink (UL) reception through at least one of the identified plurality of cells.

A terminal for performing communication in a wireless communication system according to an embodiment may include: a transceiver; and at least one processor configured to control the transceiver to transmit, to a base station, capability information indicating that the terminal supports scheduling of a plurality of cells and receive, from the base station, downlink control information (DCI) including information about the scheduled plurality of cells, identify the scheduled plurality of cells based on the received DCI, and perform downlink (DL) reception or uplink (UL) transmission through at least one of the identified plurality of cells.

A base station for performing communication in a wireless communication system according to an embodiment may include: a transceiver; and at least one process configured to control the transceiver to receive, from a terminal, capability information indicating that the terminal supports scheduling of a plurality of cells, schedule a plurality of cells for the terminal, control the transceiver to transmit downlink control information (DCI) including information about the scheduled plurality of cells, and when the scheduled plurality of cells are identified based on the received DCI, perform downlink (DL) transmission or uplink (UL) reception through at least one of the identified plurality of cells.

MODE OF DISCLOSURE

Hereinafter, embodiments of the disclosure will be described in detail with reference to accompanying drawings. While describing the disclosure, detailed descriptions of related well known functions or configurations that may blur the points of the disclosure are omitted. The terms used herein are those defined in consideration of functions in the disclosure, and may vary according to the intention of users or operators, precedents, etc. Hence, the terms used herein have to be defined based on the meaning of the terms together with the descriptions throughout the specification.

The advantages and features of the disclosure and methods of achieving them will become apparent with reference to embodiments of the disclosure described in detail below along with the attached drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the accompanying claims. In the specification, the same reference numerals denote the same elements.

Hereinafter, embodiments of the disclosure will be described in detail with reference to the attached drawings.

While describing embodiments of the disclosure, descriptions of techniques that are well known in the art and not directly related to the disclosure are omitted. This is to clearly convey the gist of the disclosure by omitting an unnecessary description.

For the same reason, some elements in the attached drawings are exaggerated, omitted, or schematically illustrated. In addition, the size of each element may not substantially reflect its actual size. In the drawings, the same or corresponding elements are denoted by the same reference numerals.

The advantages and features of the disclosure and methods of achieving them will become apparent with reference to embodiments of the disclosure described in detail below along with the attached drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing equipment, the instructions, which are executed via the processor of the computer or other programmable data processing equipment generate means for implementing the functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions specified in the flowchart block(s). Because the computer program instructions may also be loaded into a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~ unit" as herein used refers to a software or hardware component, such as field programmable gate array (FPGA) or application specific integrated circuit (ASIC) which plays a certain role. However, the term "~ unit" does not mean to be limited to software or hardware. A "~ unit" may be configured to be in an addressable storage medium or may be configured to operate one or more processors. Thus, a "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or may be further separated into additional components and "~ units". Furthermore, components and "~ units" may be implemented to operate one or more central processing units (CPUs) in a device or a secure multimedia card. Also, a unit in an embodiment may include one or more processors.

A 5th generation (5G) system considers supporting various services, compared to an existing 4th generation (4G) system. Examples of representative services may include enhanced mobile broadband (eMBB), ultra-reliable and low latency communications (URLLC), massive machine type communications (mMTC), and evolved multimedia broadcast/multicast service (eMBMS). A system providing the URLLC service may be referred to as a URLLC system, and a system providing the eMBB service may be referred to as an eMBB system. Also, the terms "service" and "system" may be interchangeably used.

As described above, a plurality of services may be provided to a user in a communication system, and in order to provide the plurality of services to the user, there is a demand for a method of providing the services in the same time domain according to characteristics of the services and an apparatus using the method.

In a wireless communication system, for example, a long term evolution (LTE) or LTE-advanced (LTE-A) system or a 5G new radio (NR) system, a base station may transmit downlink control information (DCI) including resource allocation information, through which a downlink signal transmitted from the base station to a terminal is transmitted, to the terminal through a downlink control channel (physical downlink control channel (PDCCH)) and the terminal may receive at least one downlink signal from among downlink control information (e.g., a channel-state information reference signal (CSI-RS)), a broadcast channel (physical broadcast channel (PBCH), and a downlink data channel (physical downlink shared channel (PDSCH). For example, the base station transmits downlink control information (DCI) indicating reception of a PDSCH in a subframe n through a PDCCH to the terminal, and the terminal receiving the downlink control information (DCI) receives the PDSCH in the subframe n according to the received downlink control information. In the LTE, LTE-A, or NR system, the base station may transmit downlink control information (DCI) including uplink resource allocation information to the terminal through the downlink control channel (PDCCH) and the terminal may transmit at least one uplink signal from among uplink control information (e.g., a sounding reference signal (SRS), uplink control information (UCI), or physical random access channel (PRACH)) and uplink data channel (physical uplink shared channel (PUSCH)) to the base station. For example, the terminal receiving uplink transmission configuration information (or uplink DCI or UL grant) transmitted through the PDCCH from the base station in the subframe n may perform uplink data channel transmission (hereinafter, referred to as PUSCH transmission) according to a time defined in advance (e.g., n+4), a time configured through a higher layer signal (e.g., n+k), or uplink signal transmission time indicator information (e.g., n+k) included in the uplink transmission configuration information.

When the configured downlink transmission is performed from the base station to the terminal through an unlicensed band or the configured uplink transmission is performed from the terminal to the base station through an unlicensed band, a transmission device (the base station or the terminal) may perform a channel access procedure (or listen-before talk (LBT)) for the unlicensed band in which the signal transmission is configured before or immediately before a time at which the configured signal transmission starts, and when it is determined that the unlicensed band is in an idle state based on the result of the channel access procedure, may access the unlicensed band and perform the configured signal transmission. When it is determined that the unlicensed band is not in the idle state or is in an occupied state according to the channel access procedure performed by the transmission device, the transmission device may not access the unlicensed band and thus may not perform the configured signal transmission. In the channel access procedure in the unlicensed band in which the signal transmission is configured, the transmission device receives a signal in the unlicensed band during a certain time or a time calculated according to predefined rules (e.g., a time calculated through one random value selected by at least the base station or the terminal) and compares an intensity of the received signal with a predefined threshold value or a threshold value calculated by a function including at least one parameter from among a channel bandwidth, a signal bandwidth in which the signal to be transmitted is transmitted, an intensity of transmission power, and a beam width of the transmitted signal, so as to determine whether the unlicensed band is in the idle state. For example, when the intensity of the signal received by the transmission device during 25 us is smaller than a predefined threshold value of −72 dBm, the electronic device may determine that the unlicensed band is in the idle state and may perform the configured signal transmission. In this case, a maximum time during which the signal is transmitted may be limited according to a maximum channel occupancy time (MCOT) defined for each country or each region in the unlicensed band or a type of the transmission device (e.g., the base station, the terminal, a master device, or a slave device). For example, in Japan, after performing a channel access procedure in an unlicensed band of 5 GHZ, the base station or the terminal may occupy a channel during a maximum of 4 ms without an additional channel access procedure and may transmit a signal. When the intensity of the signal received during 25 us is greater than the predefined threshold value of −72 dBm, the base station determines that the unlicensed band is not in the idle state and does not transmit a signal.

In the 5G communication system, in order to provide various services and support a high data rate, various technologies for performing retransmission in units of code block groups and transmitting an uplink signal without uplink scheduling information are introduced. Accordingly, when 5G communication is performed through an unlicensed band, a more efficient channel access procedure considering various parameters is needed.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), and LTE-Advanced (LTE-A) of the 3rd Generation Partnership Project (3GPP), high rate packet data (HRPD) and ultra mobile broadband (UMB) of 3GPP2, 802.16e of the Institute of Electrical and Electronic Engineers (IEEE), or the like. Also, communication standards of 5G or New Radio (NR) are being developed as a 5G wireless communication system.

In the wireless communication system including 5G, at least one service from among enhanced mobile broadband (eMBB), massive machine type communications (mMTC), and ultra-reliable and low-latency communications (URLLC) may be provided to a terminal. The services may be provided to the same UE during the same time period. In an embodiment, the eMBB may be a service aimed at high-speed transmission of large amounts of data, the mMTC may be a service aimed at minimizing terminal power and accessing multiple terminals, and the URLLC may be a service aimed at high reliability and low latency, but the disclosure is not limited thereto. The three services may be main scenarios in the LTE system or the 5G/NR system after LTE.

When the base station schedules data corresponding to the eMBB service in any terminal in a specific transmission time interval (TTI) and URLLC data should be transmitted in the TTI, the base station does not transmit some of the eMBB data in the frequency band in which the eMBB data has already been scheduled and is being transmitted and transmits the generated URLLC data in the frequency band. The terminal in which eMBB is scheduled and the terminal in which URLLC is scheduled may be the same terminal or different terminals. In this case, some of the eMBB data which has already been scheduled and is being transmitted are not transmitted, and thus the risk of damage to the eMBB data increases. Accordingly, in this case, it is required to determine a method of processing a signal received by the terminal in which the eMBB data is scheduled or the terminal in which the URLLC data is scheduled and a method of receiving the signal.

Hereinafter, embodiments of the disclosure will be described in detail with reference to the attached drawings. In the following description of the disclosure, a detailed description of functions and configurations incorporated herein will be omitted when it may make the subject matter of the disclosure unclear. The terms used herein are those defined in consideration of functions in the disclosure, and may vary according to the intention of users or operators, precedents, etc. Hence, the terms used herein have to be defined based on the meaning of the terms together with the descriptions throughout the specification. Hereinafter, the base station is an entity that allocates resources to the terminal and may include at least one of an eNode B, a Node B, a base station (BS), a radio access unit, a base station controller, and a node on a network. The terminal may include a user equipment (UE), a mobile station (MS), a cellular phone, a smartphone, a computer, or a multimedia system capable of performing a communication function. In the disclosure, a downlink (DL) refers to a wireless transmission path of a signal that the base station transmits to the terminal, and an uplink (UL) refers to a wireless transmission path of a signal that the terminal transmits to the base station. Hereinafter, the LTE or LTE-A system is described in an embodiment of the disclosure, but the embodiment of the disclosure may be applied to other communication systems having a similar technical background or channel type. For example, other communication systems may include 5G mobile communication technology (5G, new radio, or NR) developed after LTE-A. The embodiment of the disclosure may be applied to other communication systems through some modifications without departing from the scope of the disclosure based on determination by one of ordinary skill in the art.

The NR system, which is a representative example of the broadband wireless communication system, employs an orthogonal frequency division multiplexing (OFDM) scheme for a downlink (DL), and employs both the OFDM scheme and a single carrier frequency division multiple access (SC-FDMA) scheme for an uplink (UL). The uplink is a radio link through which the terminal (or user equipment (UE)) or a mobile station (MS) transmits data or a control signal to the base station (BS) (or an eNode B), and the downlink is a radio link through which the base station transmits data or a control signal to the terminal. In the multiple access scheme as described above, data or control information of each user may be identified by performing assignment and operation so that time-frequency resources for carrying data or control information for each user do not overlap each other, that is, orthogonality therebetween is established.

The 5G system is required to flexibly define and operate a frame structure in consideration of various services and requirements. For example, respective services may have different subcarrier spacings according to requirements. To support a plurality of subcarrier spacings in a current 5G communication system, a subcarrier spacing may be determined by using Equation 1 below.

$$\Delta f = f_0 2^m \qquad \text{Equation 1}$$

$f_0$ indicates a default subcarrier spacing of a system, and m denotes a scaling factor that is an integer. For example, when $f_0$=15 kHz, a set of subcarrier spacings allowed for the 5G communication system may include one of 3.75 kHz, 7.5 kHz, 15 kHz, 30 kHz, 60 kHz, 120 kHz, 240 kHz, and 480 kHz. A set of available subcarrier spacings may vary according to frequency bands. For example, 3.75 kHz, 7.5 kHz, 15 kHz, 30 kHz, and 60 kHz may be used in a frequency band equal to or lower than 6 GHz, and 60 kHz, 120 kHz, and 240 kHz may be used in a frequency band higher than or equal to 6 GHz.

A length of an OFDM symbol may vary depending on a subcarrier spacing of the OFDM symbol. This is because the subcarrier spacing and the length of the OFDM symbol have a reciprocal relationship therebetween according to characteristics of the OFDM symbol. For example, the symbol length is halved when the subcarrier spacing is doubled and the symbol length is doubled when the subcarrier spacing is halved.

The NR system employs a hybrid automatic repeat request (HARQ) scheme that retransmits corresponding data on a physical layer when decoding fails at initial transmission. In the HARQ scheme, when a receiver does not accurately decode data, the receiver transmits information (negative acknowledgement (NACK)) indicating a failure in decoding to a transmitter, so that the transmitter retransmits the data on the physical layer. The receiver may combine the data, which is retransmitted by the transmitter, with data previously failed in decoding, thereby increasing data reception performance. Also, when the receiver correctly decodes the data, the transmitter transmits decoding success indication information (e.g., acknowledgement (ACK)) to the transmitter so as to allow the transmitter to transmit new data.

FIG. 1 is a diagram illustrating a basic structure of a time-frequency domain that is a radio resource domain in which data or a control channel is transmitted in an uplink/downlink of an NR system or a similar system.

Referring to FIG. 1, the horizontal axis represents a time domain, and the vertical axis represents a frequency domain. A minimum transmission unit in the time domain is an OFDM or DFT-s-OFDM symbol, and $N_{symb}$ OFDM or DFT-s-OFDM symbols 101 are gathered to constitute one slot 102. Here, an OFDM symbol is a symbol when a signal is transmitted and received by using an OFDM multiplexing method, and a DFT-s-OFDM symbol is a symbol when a signal is transmitted and received by using a DFT-s-OFDM or SC-FDMA multiplexing method. Hereinafter, the disclosure will be described based on the OFDM symbol without distinction between the OFDM symbol and the DFT-s-OFDM symbol for convenience of explanation, and the description will be made based on downlink signal transmission/reception but may also be applied to uplink signal transmission/reception.

When a subcarrier spacing is 15 kHz, one slot constitutes one subframe 103, and a length of each of the slot and the subframe is 1 ms. In this case, the number of slots constituting one subframe 103 and a length of the slot may vary according to a subcarrier spacing. For example, when a subcarrier spacing is 30 kHz, four slots may be gathered to constitute one subframe 103. In this case, a length of the slot is 0.5 ms and a length of the subframe is 1 ms. A radio frame 104 is a time domain interval including 10 subframes. A minimum transmission unit in the frequency domain is a subcarrier, and a bandwidth of an entire system transmission band (transmission bandwidth) includes a total of $N_{BW}$ subcarriers 105. However, such specific values may be variably applied. For example, in an LTE system, a subcarrier spacing is 15 kHz, but two slots are gathered to constitute one subframe 103, wherein a length of the slot is 0.5 ms and a length of the subframe is 1 ms.

A basic resource unit in the time-frequency domain may be a resource element (RE) 106, and the resource element 106 may be represented by an OFDM symbol index and a subcarrier index. A resource block (RB or physical resource block (PRB)) 107 may be defined by $N_{symb}$ consecutive OFDM symbols 101 in the time domain and $$N_{SC}^{RB}$$

consecutive subcarriers 108 in the frequency domain. Accordingly, one RB 107 in one slot may include $N_{symb}$.

$$N_{SC}^{RB}$$

REs. In general, a minimum allocation unit of data in the frequency domain is the RB 107. In the NR system, in general, $N_{symb}$=14, $$N_{SC}^{RB} = 12,$$

and the number of RBs ($N_{RB}$) may vary according to a bandwidth of a system transmission band.

Downlink control information may be transmitted within first N OFDM symbols in the subframe. In general, N={1, 2, 3}, and a UE may be configured with the number of symbols on which the downlink control information may be transmitted, from a base station through a higher layer signal. The base station may change the number of symbols on which the downlink control information may be transmitted in each slot according to the amount of control information to be transmitted in a current slot, and may transfer information about the number of symbols to the UE via a separate downlink control channel.

In NR, one component carrier (CC) or serving cell may include up to 250 or more RBs. Accordingly, when the UE always receives the full serving cell bandwidth as in LTE, the power consumption of the UE may be extreme. In order to solve this problem, the base station may configure one or more bandwidth parts (BWPs) for the UE and support the UE to change a reception area within the cell. In NR, the base station may configure an 'initial BWP', which is a bandwidth of control resource set (CORESET) #0 (or common search space CSS)), for the UE through a master information block (MIB). Next, the base station may configure a first BWP of the UE through RRC signaling, and may notify at least one BWP configuration information that may be indicated through downlink control information (DCI) later. Thereafter, the base station may indicate a band to be used by the UE by announcing a BWP ID through DCI. When the UE fails to receive DCI on the currently allocated BWP for a specific period of time or longer, the UE may return to a 'default BWP' and attempt to receive DCI.

Figure 2:
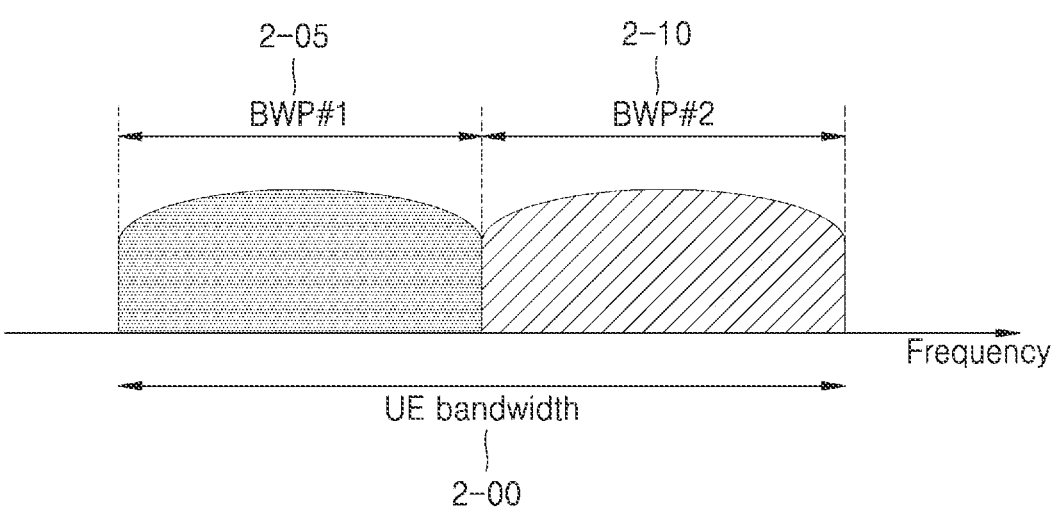
FIG. 2 is a diagram illustrating a bandwidth part (BWP) in a wireless communication system, according to an embodiment of the disclosure.

Referring to FIG. 2, a UE bandwidth 2-00 is configured to have two BWPs, i.e., BWP #1 2-05 and BWP #2-10. The base station may configure one or more BWPs for the UE, and may configure information as shown in Table 1 for each BWP.

TABLE 1

| BWP ::= | SEQUENCE { | |
|---|---|---|
| bwp-Id | BWP-Id, | |
| locationAndBandwidth | INTEGER (1..65536), | |
| subcarrierSpacing | ENUMERATED {n0, n1, n2, n3, n4, n5}, | 5 |
| cyclicPrefix | ENUMERATED { extended } | |
| } | | |

Of course, the disclosure is not limited to the above example. In addition to the above-described configuration information, various parameters related to the BWPs may be configured for in the UE. The base station may transmit the information to the UE through higher layer signaling, for example, RRC signaling. At least one of the configured one or more BWPs may be activated. Information about whether to activate the configured BWP may be transmitted from the base station to the UE semi-statically through RRC signaling or dynamically through a medium access control (MAC) control element (CE) or DCI.

According to an embodiment, the UE before RRC connection may be configured with an initial BWP for initial access through a master information block (MIB) from the base station. In more detail, the UE may receive configuration information for a search space and a control resource set (CORESET) where a physical downlink control channel (PDCCH) may be transmitted in order to receive system information (e.g., remaining system information (RMSI) or system information block 1 (SIB1)) required for initial access through the MIB in an initial access stage. An identifier (ID) of the control resource set and the search space configured through the MIB may be considered as 0.

The base station may notify configuration information such as frequency allocation information, time allocation information, and numerology for a control resource set #0 through the MIB to the UE. Also, the base station may notify configuration information for a monitoring period and an occasion for the control resource set #0, that is, configuration information for a search space #0, through the MIB to the UE. The UE may consider a frequency domain configured as the control resource set #0 obtained from the MIB as the initial BWP for initial access. In this case, an ID of the initial BWP may be considered as 0.

In a method of configuring the BWP, UEs before RRC connection may receive configuration information about an initial BWP through an MIB in an initial access stage. More specifically, the UE may be configured with a control resource set (CORESET) for a downlink control channel through which downlink control information (DCI) for scheduling a system information block (SIB) may be transmitted, from an MIB of a physical broadcast channel (PBCH). The bandwidth of the control resource set configured through the MIB may be regarded as an initial BWP, and the UE may receive a PDSCH, through which the SIB is transmitted, via the configured initial BWP. In addition to the purpose of receiving the SIB, the initial BWP may be utilized for other system information (OSI), paging, and random access.

A synchronization signal (SS)/PBCH block (SSB) in a next-generation mobile communication system (5G or NR system) will now be described.

The SS/PBCH block may refer to a physical layer channel block including a primary SS (PSS), a secondary SS (SSS), and a PBCH. In more detail, the SS/PBCH block may be defined as follows.

PSS: a reference signal for downlink time/frequency synchronization, which may provide some formation of a cell ID.

SSS: a reference signal for downlink time/frequency synchronization, which may provide the remaining information of the cell ID which is not provided by the PSS. Additionally, the SSS may serve as another reference signal for demodulation of the PBCH.

PBCH: a channel for providing essential system information required for transmission and reception of a data channel and a control channel of the UE. The essential system information may include search space-related control information indicating radio resource mapping information of the control channel, and scheduling control information for a separate data channel that transmits system information.

SS/PBCH block: the SS/PBCH block may be a combination of the PSS, the SSS, and the PBCH. One or more SS/PBCH blocks may be transmitted within 5 ms, and each of the transmitted SS/PBCH blocks may be distinguished by an index.

The UE may detect the PSS and the SSS in the initial access stage, and may decode the PBCH. The UE may obtain an MIB from the PBCH, and may be configured with a control resource set #0. The UE may monitor the control resource set #0 by assuming that a selected SS/PBCH block and a demodulation reference signal (DMRS) transmitted in the control resource set #0 are quasi-co-located (QCLed). The UE may receive system information as downlink control information transmitted in the control resource set #0. The UE may obtain random-access-channel (RACH)-related configuration information required for initial access from the received system information. The UE may transmit a physical RACH (PRACH) to the base station in consideration of the selected SS/PBCH index, and the base station receiving the PRACH may obtain information about the SS/PBCH block index selected by the UE. The base station may recognize which block has been selected by the UE from among the SS/PBCH blocks and may monitor the control resource set #0 corresponding to (associated with) the SS/PBCH block selected by the UE.

Downlink control information (DCI) in a next-generation mobile communication system (5G or NR system) will now be described in detail.

In the next-generation mobile communication system (5G or NR system), scheduling information for uplink data (or physical uplink shared channel (PUSCH)) or downlink data (or physical downlink shared channel (PDSCH)) may be transmitted from the base station to the UE through DCI. The UE may monitor a fallback DCI format and a non-fallback DCI format with respect to the PUSCH or the PDSCH. The fallback DCI format may include a fixed field predefined between the base station and the UE, and the non-fallback DCI format may include a configurable field.

The DCI may be channel-coded and modulated and then be transmitted through a physical downlink control channel (PDCCH). A cyclic redundancy check (CRC) may be attached to a payload of a DCI message. The CRC may be scrambled with a radio network temporary identifier (RNTI) corresponding to the identity of the UE. Different RNTIs may be used for scrambling the CRC attached to the payload of the DCI according to the purpose of the DCI message, for example, transmission of UE-specific data, a power control command, or a random access response. In other words, the RNTI may be included in a CRC calculation process and may be transmitted, instead of being explicitly transmitted. When the UE receives the DCI message transmitted through the PDCCH, the UE may check the CRC by using the assigned RNTI. When the CRC check result is correct, the UE may recognize that the message is intended for the UE.

For example, the DCI for scheduling a PDSCH for system information (SI) may be scrambled with a system information RNTI (SI-RNTI). The DCI for scheduling a PDSCH for a random access response (RAR) message may be scrambled with a random access RNTI (RA-RNTI). The DCI for scheduling a PDSCH for a paging message may be scrambled with a paging RNTI (P-RNTI). The DCI for notifying a slot format indicator (SFI) may be scrambled with a slot format indicator RNTI (SFI-RNTI). DCI for notifying transmit power control (TPC) may be scrambled with a transmit power control RNTI (TPC-RNTI). DCI for scheduling a UE-specific PDSCH or PUSCH may be scrambled with a cell RNTI (C-RNTI).

DCI format 0_0 may be used as fallback DCI that schedules a PUSCH. In this case, a CRC may be scrambled with a C-RNTI. In an embodiment, DCI format 0_0 in which the CRC is scrambled with the C-RNTI may include information as shown in Table 2.

TABLE 2

| Identifier for DCI formats | [1] bit |
|---|---|
| Frequency domain resource assignment | $[\lceil \log_2(N_{RB}^{UL,BWP}(N_{RB}^{UL,BWP}+1)/2)\rceil]$bits |
| Time domain resource assignment | X bits |
| Frequency hopping flag | 1 bit. |
| Modulation and coding scheme | 5 bits |
| New data indicator | 1 bit |
| Redundancy version | 2 bits |
| HARQ process number | 4 bits |
| TPC command for scheduled PUSCH | [2] bits |
| UL/SUL indicator | 0 or 1 bit |

DCI format 0_1 may be used as non-fallback DCI that schedules a PUSCH. In this case, a CRC may be scrambled with a C-RNTI. In an embodiment, DCI format 0_1 in which the CRC is scrambled with the C-RNTI may include information as shown in Table 3.

TABLE 3

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P\rceil$ bits
    For resource allocation type 1, $\lceil \log_2(N_{RB}^{UL,BWP}(N_{RB}^{UL,BWP}+1)/2)\rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits $$SRS \text{ resource indicator } \left\lceil \log_2\left(\sum_{k=1}^{L_{max}}\binom{N_{SRS}}{k}\right)\right\rceil \text{ or } \lceil \log_2(N_{SRS})\rceil \text{ bits}$$

$$\left\lceil \log_2\left(\sum_{k=1}^{L_{max}}\binom{N_{SRS}}{k}\right)\right\rceil \text{ bits for non-codebook based } PUSCH \text{ transmission;}$$

$\lceil \log_2(N_{SRS})\rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit DCI format 1_0 may be used as fallback DCI that schedules a PDSCH. In this case, a CRC may be scrambled with a C-RNTI. In an embodiment, DCI format 1_0 in which the CRC is scrambled with the C-RNTI may include information as shown in Table 4.

TABLE 4

- Identifier for DCI formats - [1] bit
- Frequency domain resource assignment -$[\lceil \log_2(N_{RB}^{DL,BWP}(N_{RB}^{DL,BWP} + 1)/2)\rceil]$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator
  - 3 bits
- PDSCH-to-HARQ feedback timing indicator
  - [3] bits Alternatively, DCI format 1_0 may be used as DCI that schedules a PDSCH for an RAR message. In this case, a CRC may be scrambled with an RA-RNTI. DCI format 1_0 in which the CRC is scrambled with the C-RNTI may include information as shown in Table 5.

TABLE 5

- Frequency domain resource assignment -$\lceil \log_2(N_{RB}^{DL,BWP}(N_{RB}^{DL,BWP} + 1)/2)\rceil$ bits
- Time domain resource assignment - 4 bits
- VRB-to-PRB mapping - 1 bit
- Modulation and coding scheme - 5 bits
- TB scaling - 2 bits
- Reserved bits - 16 bits DCI format 1_1 may be used as non-fallback DCI that schedules a PDSCH. In this case, a CRC may be scrambled with a C-RNTI. In an embodiment, DCI format 1_1 in which the CRC is scrambled with the C-RNTI may include information as shown in Table 6.

TABLE 6

- Carrier indicator - 0 or 3 bits
- Identifier for DCI formats - [1] bits
- Bandwidth part indicator - 0, 1 or 2 bits
- Frequency domain resource assignment
  - For resource allocation type 0,$\lceil N_{RB}^{DL,BWP} / P\rceil$ bits
  - For resource allocation type 1,$\lceil \log_2(N_{RB}^{DL,BWP}(N_{RB}^{DL,BWP} + 1)/2)\rceil$ bits
- Time domain resource assignment -1, 2, 3, or 4 bits
- VRB-to-PRB mapping - 0 or 1 bit, only for resource allocation type 1.
  - 0 bit if only resource allocation type 0 is configured;
  - 1 bit otherwise.
- PRB bundling size indicator                    - 0 or 1 bit
- Rate matching indicator                    - 0, 1, or 2 bits
- ZP CSI-RS trigger {                    - 0, 1, or 2 bits
For transport block 1 :
- Modulation and coding scheme - 5 bits
- New data indicator - 1 bit
- Redundancy version - 2 bits
For transport block 2 :
- Modulation and coding scheme - 5 bits
- New data indicator - 1 bit
- Redundancy version - 2 bits
- HARQ process number - 4 bits
- Downlink assignment index - 0 or 2 or 4 bits TABLE 6-continued

| | |
|---|---|
| - | TPC command for scheduled PUCCH - 2 bits |
| - | PUCCH resource indicator - 3 bits |
| - | PDSCH-to-HARQ_feedback timing indicator - 3 bits |
| - | Antenna ports - 4, 5 or 6 bits |
| - | Transmission configuration indication                           - 0 or 3 bits |
| - | SRS request - 2 bits |
| - | CBG transmission information - 0, 2, 4, 6, or 8 bits |
| - | CBG flushing out information                                   - 0 or 1 bit |
| - | DMRS sequence initialization - 1 bit |

Figure 3:
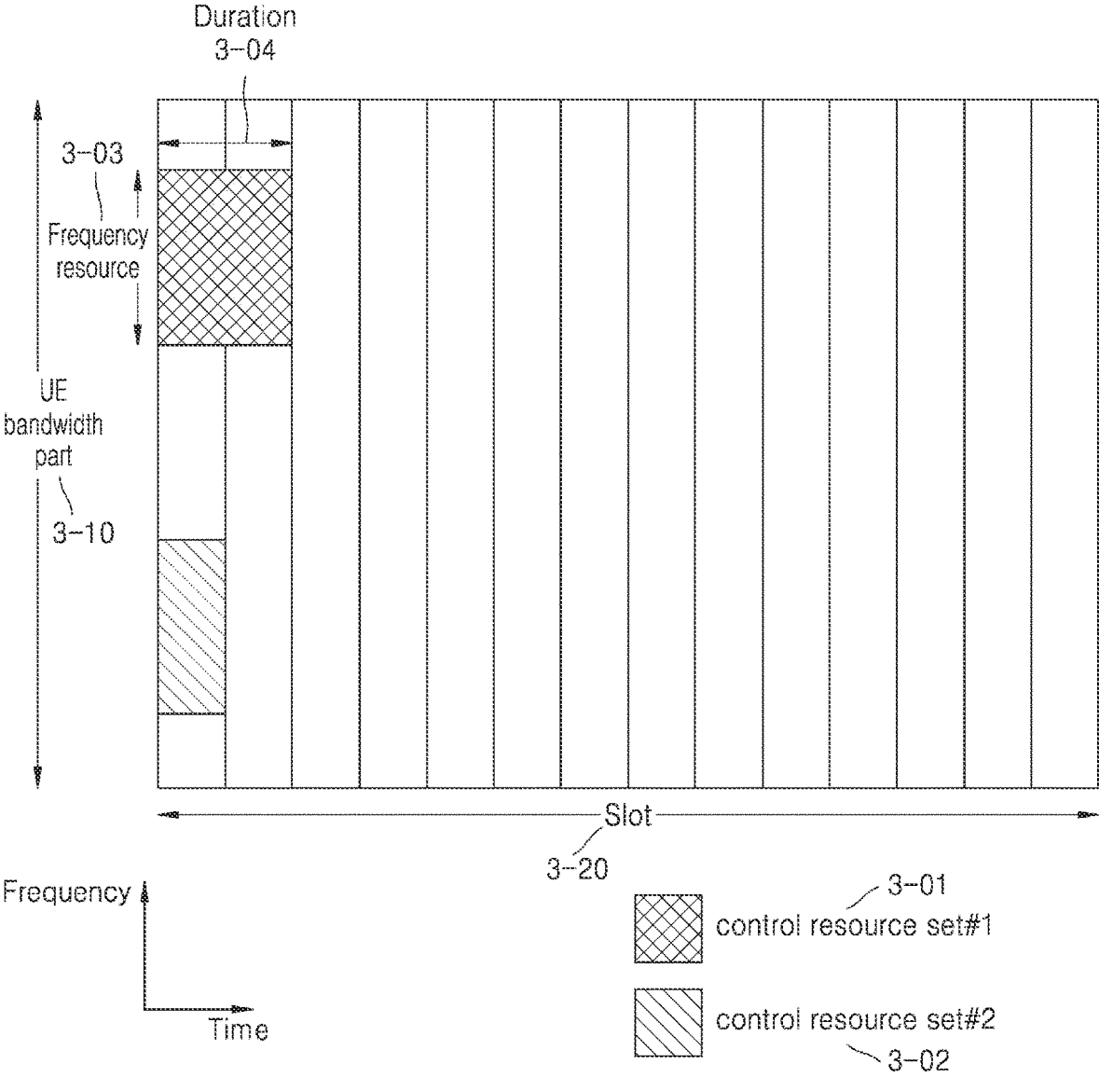
FIG. 3 is a diagram illustrating configuration of a control resource set of a downlink control channel in a wireless communication system, according to an embodiment of the disclosure.

FIG. 3 is a diagram illustrating a control resource set (CORESET) in which a downlink control channel is transmitted in a 5G wireless communication system, according to an embodiment of the disclosure.

Referring to FIG. 3, FIG. 3 illustrates an embodiment in which two control resource sets (i.e., control resource set #1 (3-01) and control resource set #2 (3-02)) are configured within a UE BWP 3-10 in a frequency domain and one slot 3-20 in a time domain. The control resource set 3-01 or 3-02 may be configured in a specific frequency resource 3-03 within the entire UE BWP 3-10 in the frequency domain. The control resource set 3-01 or 3-02 may be configured using one or more OFDM symbols in the time domain, and this may be defined as control resource set duration 3-04. Referring to FIG. 3, control resource set #1 3-01 may be configured to have a control resource set duration of two symbols, and control resource set #2 3-02 may be configured to have a control resource set duration of one symbol.

The above-described control resource set in a next-generation mobile communication system (5G or NR system) may be configured through higher layer signaling (e.g., system information, a master information block (MIB), or radio resource control (RRC) signaling) transmitted from a base station to a UE. Configuring the control resource set for the UE denotes providing the UE with information such as a control resource set identity, a frequency location of the control resource set, a symbol duration of the control resource set, and the like. For example, the configuration of the control resource set may include information as shown in Table 7.

In Table 7, tci-StatesPDCCH (referred to as "TCI state") configuration information may include information of one or more synchronization signal (SS)/physical broadcast channel (PBCH) block indexes or channel state information reference signal (CSI-RS) indexes having a quasi co-located (QCL) relationship with a demodulation reference signal (DMRS) transmitted in the corresponding control resource set. Further, frequencyDomainResources configuration information configures a frequency resource of a corresponding CORESET via a bitmap. Each bit indicates a group of 6 PRBs that do not overlap. A first group refers to a group of 6 PRBs having a first PRB index as $$6 \cdot \lceil N_{BWP}^{start} / 6 \rceil,$$

where $$N_{BWP}^{start}$$

represents a BWP start point. A most significant bit of the bitmap indicates the first group and is configured in an ascending order.

One or more different antenna ports (these may be replaced with one or more channels, signals, and a combination thereof, but will be collectively referred to as "different antenna ports" in the description of the disclosure below for convenience of explanation) may be associated with each other by QCL configuration as shown in Table 8 below in the wireless communication system.

TABLE 7

```
ControlResourceSet ::=              SEQUENCE {
  -- Corresponds to L1 parameter 'CORESET-ID'
  controlResourceSetId              ControlResourceSetId,
  frequencyDomainResources            BIT STRING (SIZE (45)),
  duration                        INTEGER (1 . . . maxCoReSetDuration),
  cce-REG-MappingType                  CHOICE {
    interleaved                    SEQUENCE {
      reg-BundleSize                ENUMERATED {n2, n3, n6},
      precoderGranularity              ENUMERATED {sameAsREG-
    bundle, allContiguousRBs},
      interleaverSize              ENUMERATED {n2, n3, n6}
      shiftIndex
      INTEGER(0 . . . maxNrofPhysicalResourceBlocks-1)
        (Interleaver shift)
  },
    nonInterleaved                NULL
  },
  tci-StatesPDCCH                  SEQUENCE(SIZE (1 . . . maxNrofTCI-
    StatesPDCCH)) OF TCI-StateId      OPTIONAL,
  (QCL configuration information)
  tci-PresentInDCI                ENUMERATED {enabled}
}
```

TABLE 8

```
QCL-Info ::=              SEQUENCE {
   cell                  ServCellIndex (index of serving cell in
which QCL reference RS is transmitted)
   bwp-Id                BWP-Id (index of BWP on which QCL
reference RS is transmitted)
   referenceSignal       CHOICE { (indicator indicating one of CSI-
                         RS
or SS/PBCH block as QCL reference RS)
      csi-rs             NZP-CSI-RS-ResourceId,
      ssb                SSB-Index
   },
   qcl-Type              ENUMERATED {typeA, typeB, typeC,
                         typeD},
(QCL type indicator)
   . . .
}
```

Specifically, QCL configuration may connect two different antenna ports as a relationship of a (QCL) target antenna port and a (QCL) reference antenna port, and the UE may apply (or assume) all or some of statistical characteristics of a channel measured at the reference antenna port (e.g., large scale parameters of the channel, such as Doppler shift, Doppler spread, average delay, delay spread, average gain, spatial Rx (or Tx) parameters, and the like, or a reception spatial filter coefficient or transmission spatial filter coefficient of the UE) in reception through the target antenna port. The target antenna port indicates an antenna port for transmitting the channel or the signal configured through higher layer configuration including the QCL configuration, or an antenna port for transmitting the channel or the signal to which a TCI state indicating the QCL configuration is applied. The reference antenna port indicates an antenna port for transmitting the channel or the signal indicated (specified) by the parameter "referenceSignal" in the QCL configuration.

Specifically, the statistical characteristics of the channel defined by the QCL configuration (indicated by the parameter "qcl-Type" in the QCL configuration) may be classified as follows according to the QCL type.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Although the QCL types are not limited to the four types described above, all possible combinations will not be provided so as to not obscure the subject matter of description. QCL-TypeA is a QCL type used in the case where the bandwidth and the transmission interval of the target antenna port are sufficient compared to the reference antenna port (i.e., in the case where the number of samples and the transmission band/time of the target antenna port are greater than the number of samples and the transmission band/time of the reference antenna port both in the frequency domain and in the time domain) so that all statistical characteristics, which are measurable in the frequency and time domains, are referenceable. QCL-TypeB is a QCL type used in the case where the bandwidth of the target antenna port is sufficient to measure the statistical characteristics, which are measurable in the frequency domain, that is, Doppler shift and Doppler spread. QCL-TypeC is a QCL type used in the case where only the first-order statistics, that is, Doppler shift and average delay, are referenceable because the bandwidth and the transmission interval of the target antenna port are insufficient to measure the second-order statistics, that is, Doppler spread and delay spread. QCL-TypeD is a QCL type configured in the case where spatial reception filter values used when receiving the reference antenna port are able to be used when receiving the target antenna port.

Meanwhile, the base station is able to configure or indicate up to two QCL configurations with respect to one target antenna port through TCI state configuration as shown in Table 9A.

Table 9A

```
TCI-State ::=     SEQUENCE {
   tci-StateId       TCI-StateId,
   qcl-Type1         QCL-Info, (first QCL configuration for target
antenna port to which corresponding TCI state is applied)
   qcl-Type2         QCL-Info (second QCL configuration for target
antenna port to which corresponding TCI state is applied)
                     OPTIONAL, -- Need R
   . . .
}
```

The first QCL configuration among the two QCL configurations included in one TCI state configuration may be configured as one of QCL-TypeA, QCL-TypeB, and QCL-TypeC. In this case, the configurable QCL type is specified depending on the types of the target antenna port and the reference antenna port, and will be described in detail below. In addition, the second QCL configuration among the two QCL configurations included in the one TCI state configuration may be configured as QCL-TypeD, and may be omitted in some cases.

Tables 9BA through 9BE show valid TCI state configurations depending on the type of the target antenna port.

Table 9BA shows valid TCI state configurations in the case where the target antenna port is a CSI-RS for tracking (TRS). The TRS indicates an NZP CSI-RS in which a repetition parameter is not configured and in which "trs-Info" is configured to be true, among the CSI-RSs. Configuration 3 in Table 9BA may be used for aperiodic TRS.

TABLE 9BA

| Valid TCI state configurations when target antenna port is CSI-RS for tracking (TRS) | | | | |
|---|---|---|---|---|
| Valid TCI state Configuration | DL RS 1 | qcl-Type1 | DL RS 2 (if configured) | qcl-Type2 (if configured) |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 9BB shows valid TCI state configurations in the case where the target antenna port is a CSI-RS for CSI. The CSI-RS for CSI indicates an NZP CSI-RS, among the CSI-RSs, in which a repetition parameter is not configured and in which "trs-Info" is not configured to be true.

TABLE 9BB

| Valid TCI state configurations when target antenna port is CSI-RS for CSI | | | | |
|---|---|---|---|---|
| Valid TCI state Configuration | DL RS 1 | qcl-Type1 | DL RS 2 (if configured) | qcl-Type2 (if configured) |
| 1 | TRS | QCL-TypeA | SSB | QCL-TypeD |
| 2 | TRS | QCL-TypeA | CSI-RS for BM | QCL-TypeD |

TABLE 9BB-continued

| Valid TCI state configurations when target antenna port is CSI-RS for CSI | | | |
|---|---|---|---|
| Valid TCI state Configuration | DL RS 1 | qcl-Type1 | DL RS 2 (if configured) | qcl-Type2 (if configured) |
| 3 | TRS | QCL-TypeA | TRS (same as DL RS 1) | QCL-TypeD |
| 4 | TRS | QCL-TypeB | | |

Table 9BC shows valid TCI state configurations in the case where the target antenna port is a CSI-RS for beam management (BM) (the same meaning as a CSI-RS for L1 RSRP reporting). The CSI-RS for BM indicates an NZP CSI-RS, among the CSI-RSs, in which a repetition parameter is configured to have a value of On or Off and in which "trs-Info" is not configured to be true.

TABLE 9BC

| Valid TCI state configurations when target antenna port is CSI-RS for BM (for L1 RSRP reporting) | | | |
|---|---|---|---|
| Valid TCI state Configuration | DL RS 1 | qcl-Type1 | DL RS 2 (if configured) | qcl-Type2 (if configured) |
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 9BD shows valid TCI state configurations in the case where the target antenna port is a PDCCH DMRS.

TABLE 9BD

| Valid TCI state configurations when target antenna port is PDCCH DMRS | | | |
|---|---|---|---|
| Valid TCI state Configuration | DL RS 1 | qcl-Type1 | DL RS 2 (if configured) | qcl-Type2 (if configured) |
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9BE shows valid TCI state configurations in the case where the target antenna port is a PDSCH DMRS.

TABLE 9BE

| Valid TCI state configurations when target antenna port is PDSCH DMRS. | | | |
|---|---|---|---|
| Valid TCI state Configuration | DL RS 1 | qcl-Type1 | DL RS 2 (if configured) | qcl-Type2 (if configured) |
| 1 | TRS | QCL-TypeA | TRS | QCL-TypeD |
| 2 | TRS | QCL-TypeA | CSI-RS (BM) | QCL-TypeD |

TABLE 9BE-continued

| Valid TCI state configurations when target antenna port is PDSCH DMRS. | | | |
|---|---|---|---|
| Valid TCI state Configuration | DL RS 1 | qcl-Type1 | DL RS 2 (if configured) | qcl-Type2 (if configured) |
| 3 | CSI-RS (CSI) | QCL-TypeA | CSI-RS (CSI) | QCL-TypeD |

A typical QCL configuration method by Tables 9BA to 9BE is configuring the target antenna port and the reference antenna port for respective operations as "SSB"→"TRS"→"CSI-RS for CSI, CSI-RS for BM, PDCCH DMRS, or PDSCH DMRS" and operating the same. Through this, the statistical characteristics, which are measurable from the SSB and the TRS, may be associated with the respective antenna ports, thereby assisting the UE with the reception operation.

Figure 4:
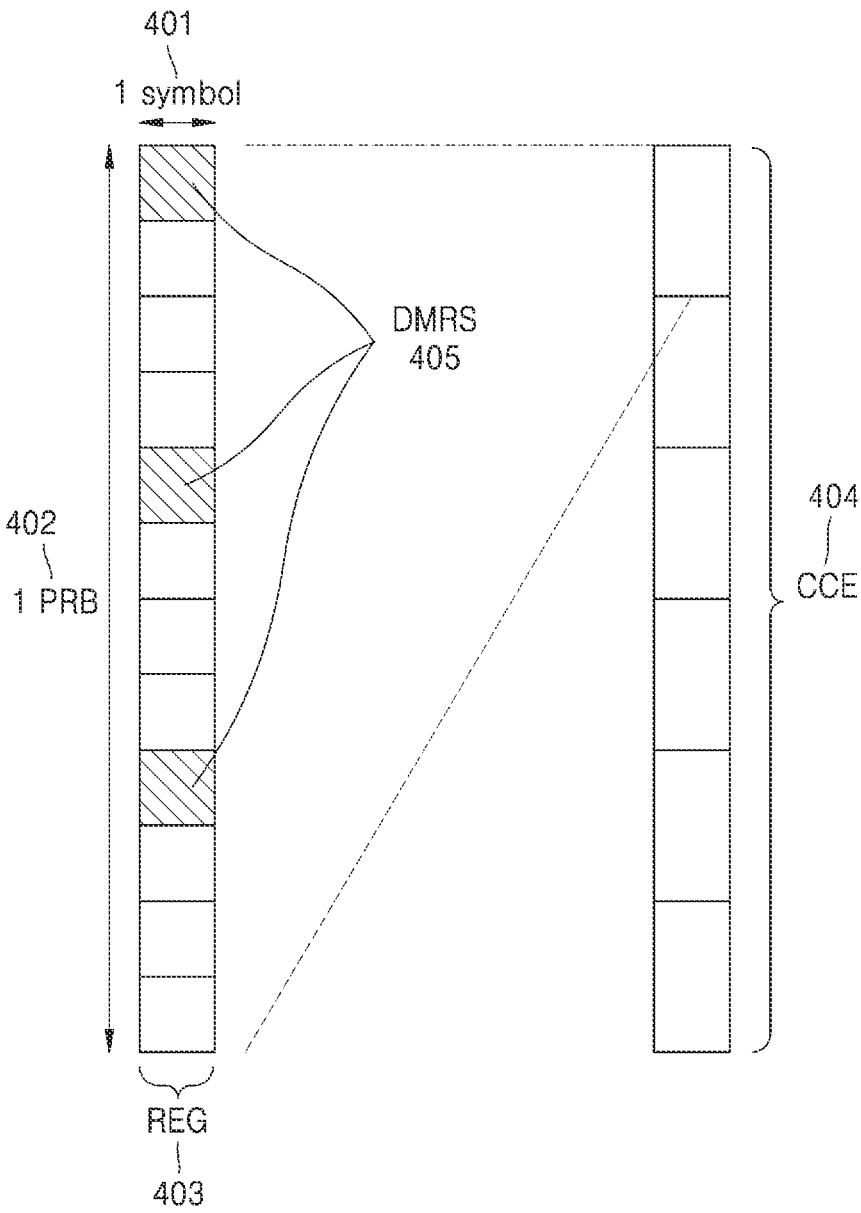
FIG. 4 is a diagram illustrating a structure of a downlink control channel in NR.

FIG. 4 is a diagram illustrating a structure of a downlink control channel in a wireless communication system, according to an embodiment of the disclosure. That is, FIG. 4 is a diagram illustrating a basic unit of time and frequency resources constituting a downlink control channel to be used in 5G, according to an embodiment of the disclosure.

Referring to FIG. 4, a basic unit of time and frequency resources constituting a control channel may be defined as a resource element group (REG) 403. The REG 403 may be defined by 1 OFDM symbol 401 in a time domain and 1 physical resource block (PRB) 402 in a frequency domain, that is, 12 subcarriers. A base station may configure a downlink control channel allocation unit by concatenating the REGs 403.

As shown in FIG. 4, assuming that the basic unit in which the downlink control channel is allocated in 5G is a control channel element (CCE) 404, 1 CCE 404 may include a plurality of REGs 403. For example, the REG 403 shown in FIG. 5 may include 12 REs, and when 1 CCE 404 includes 6 REGs 403, 1 CCE 404 may include 72 REs. When a downlink control resource set is configured, the corresponding set may include a plurality of CCEs 404, and a specific downlink control channel may be mapped to one or more CCEs 404 according to an aggregation level (AL) in the control resource set, and may then be transmitted. The CCEs 404 in the control resource set are identified by numbers, and the numbers of the CCEs 404 may be assigned according to a logical mapping method.

The basic unit of the downlink control channel shown in FIG. 4, that is, the REG 403, may include both the REs to which DCI is mapped and an area to which a DMRS 405, which is a reference signal for decoding the same, is mapped. As shown in FIG. 4, three DMRSs 405 may be transmitted in 1 REG 403. The number of CCEs required for transmitting a PDCCH may be 1, 2, 4, 8, or 16 depending on the aggregation level (AL), and the different numbers of CCEs may be used to implement link adaptation of the downlink control channel. For example, when AL=L, one downlink control channel may be transmitted through L CCEs.

A UE needs to detect a signal without being aware of information about the downlink control channel, and a search space indicating a set of CCEs may be defined for blind decoding. The search space is a set of downlink control channel candidates including CCEs that the UE must attempt to decode at a given aggregation level. Because there are various aggregation levels making one bundle of 1, 2, 4, 8, or 16 CCEs, the UE may have a plurality of search spaces. The search space set may be defined as a set of search spaces at all configured aggregation levels.

The search spaces may be classified into a common search space and a UE-specific search space. According to an embodiment of the disclosure, a specific group of UEs or all UEs may check a common search space of the PDCCH in units of symbols within a slot for the search space, a search space type (the common search space or the UE-specific search space), a combination of a DCI format and an RNTI to be monitored in the search space, a control resource set index for monitoring the search space, and the like for the UE. For example, the above-described configuration may include information as shown in Table 10 below.

TABLE 10

```
SearchSpace ::=                              SEQUENCE
  -- Identity of the search space.SearchSpaceId = 0 identifies the SearchSpace
     configured via PBCH (MIB) or ServingCellConfigCommon.
  searchSpaceId                              SearchSpaceId,
  controlResourceSetId                       ControlResourceSetId,
  monitoringSlotPeriodicityAndOffset            CHOICE {
    sl1                                      NULL,
    sl2                                      INTEGER (0 . . . 1),
    sl4                                      INTEGER (0 . . . 3),
    sl5                                      INTEGER (0 . . . 4),
    sl8                                      INTEGER (0 . . . 7),
    sl10                                     INTEGER (0 . . . 9),
    sl16                                     INTEGER (0 . . . 15),
    sl20                                     INTEGER (0 . . . 19)
  }
  duration (monitoring duration)             INTEGER (2 . . . 2559)
  monitoringSymbolsWithinSlot                   BIT STRING (SIZE (14))
  nrofCandidates                            SEQUENCE {
  (number of PDCCH candidates per aggregation level)
    aggregationLevel1                        ENUMERATED {n0, n1, n2, n3,
    n4, n5, n6, n8},
    aggregationLevel2                        ENUMERATED {n0, n1, n2, n3,
    n4, n5, n6, n8},
    aggregationLevel4                        ENUMERATED {n0, n1, n2, n3,
    n4, n5, n6, n8},
    aggregationLevel8                        ENUMERATED {n0, n1, n2, n3,
    n4, n5, n6, n8},
    aggregationLevel16                       ENUMERATED {n0, n1, n2, n3,
    n4, n5, n6, n8}
  },
  searchSpaceType                            CHOICE {
    -- Configures this search space as common search space (CSS) and DCI
    formats to monitor.
    common                                   SEQUENCE {
    }
    ue-Specific                              SEQUENCE {
    -- Indicates whether the UE monitors in this USS for DCI formats
    0-0 and 1-0 or for formats 0-1 and 1-1.
      formats                                ENUMERATED {formats0-0-
    And-1-0, formats0-1-And-1-1},
    . . .
  }
``` order to receive cell-common control information such as dynamic scheduling for system information or a paging message.

For example, the UE may receive PDSCH scheduling allocation information for transmission of an SIB including cell operator information and the like by checking the common search space of the PDCCH. In the case of the common search space, because a specific group of UEs or all UEs must receive the PDCCH, the common search space may be defined as a set of predetermined CCEs. Meanwhile, the UE may receive scheduling allocation information for a UE-specific PDSCH or PUSCH by checking the UE-specific search space of the PDCCH. The UE-specific search space may be UE-specifically defined as a function of the UE identity and various system parameters.

In 5G, the parameters of the search space for the PDCCH may be configured for the UE by the base station using higher layer signaling (e.g., SIB, MIB, or RRC signaling). For example, the base station may configure the number of PDCCH candidates at each aggregation level L, monitoring periodicity for the search space, a monitoring occasion in The base station may configure one or more search space sets for the UE, based on configuration information. According to an embodiment of the disclosure, the base station may configure search space set 1 and search space set 2 for the UE, may configure DCI format A scrambled with an X-RNTI in search space set 1 so as to be monitored in the common search space, and may configure DCI format B scrambled with a Y-RNTI in search space set 2 so as to be monitored in the UE-specific search space.

According to configuration information, the common search space or the UE-specific search space may include one or more search space sets. For example, search space set #1 and search space set #2 may be configured as the common search space, and search space set #3 and search space set #4 may be configured as the UE-specific search space.

The common search space may be classified into a specific type of search space set according to the purpose thereof. The RNTI to be monitored may differ between the determined types of search space sets. For example, the common search space types, the purposes, and the RNTIs to be monitored may be classified as shown in Table 10A below.

TABLE 10A

| Search Space Type | Purpose | RNTI |
|---|---|---|
| Type0 CSS | PDCCH transmission for SIB scheduling | SI-RNTI |
| Type0A CSS | PDCCH transmission for SI scheduling (SIB2) other than SIB1 | SI-RNTI |
| Type1 CSS | PDCCH transmission for random access response (RAR) scheduling, Msg3 retransmission scheduling, and Msg4 scheduling | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | In case of PCell, PDCCH transmission for data scheduling | C-RNTI, MCS-C-RNTI, CS-RNTI |

Meanwhile, the following combinations of DCI formats and RNTIs may be monitored in the common search space. This is merely an example, and the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. However, this is merely an example, and the combinations of DCI formats and RNTIs are not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and usages as follows.

Cell RNTI (C-RNTI) for scheduling of UE-specific PDSCH

Temporary cell RNTI (TC-RNTI) for scheduling of UE-specific PDSCH

Configured scheduling RNTI (CS-RNTI) for scheduling of semi-statically configured UE-specific PDSCH Random access RNTI (RA-RNTI) for scheduling of PDSCH in random access stage Paging RNTI (P-RNTI) for scheduling of PDSCH in which paging is transmitted System information RNTI (SI-RNTI) for scheduling of PDSCH in which system information is transmitted Interruption RNTI (INT-RNTI) for informing of puncturing on PDSCH Transmit power control for PUSCH RNTI (TPC-PUSCH-RNTI) for indicating power control command for PUSCH Transmit power control for PUCCH RNTI (TPC-PUCCH-RNTI) for indicating power control command for PUCCH Transmit power control for SRS RNTI (TPC-SRS-RNTI) for indicating power control command for SRS In an embodiment, the above-described DCI formats may be defined as shown in Table 11 below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, with a control resource set p and a search space set S, a search space at an aggregation level L may be expressed as in the following equation.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \left\lfloor \frac{N_{CCE,p}}{L} \right\rfloor \right\} + i \qquad \text{Equation 2}$$

L: Aggregation level $n_{CI}$: Carrier index $N_{CCE,p}$: Total number of CCEs present within control resource set p $$n_{s,f}^{\mu} :$$

Slot index $M_{p,s,max}^{(L)}$: Number of PDCCH candidates at aggregation level L $$m_{s,n_{CI}} = 0, \ldots, M_{p,s,max}^{(L)} - 1 :$$

Index of PDCCH candidates at aggregation level L
i=0, . . . , L−1

$$Y_{p,n_{s,f}^{\mu}} = \left(A_p \cdot Y_{p,n_{s,f}^{\mu}-1}\right) \bmod D,$$

$Y_{p,-1} = n_{RNTI} \neq 0$, $A_0=39827$, $A_1=39829$, $A_2=39839$, $D=65537$ $n_{RNTI}$: UE identifier $$Y_{p,n_{s,f}^{\mu}}$$

may correspond to 0 in a common search space.
In a UE-specific search space, $$Y_{p,n_{s,f}^{\mu}}$$

may vary according to UE identity (C-RNTI or ID configured by the vase station for the UE) and a time index.

According to an embodiment of the disclosure, a plurality of search space sets may be configured using different parameters (e.g., the parameters in Table 10) in 5G. Therefore, a set of search space sets monitored by the UE may differ at each time. For example, when search space set #1 is configured as the X-slot periodicity, search space set #2 is configured as the Y-slot periodicity, and when X and Y are different, the UE may monitor both search space set #1 and search space set #2 in a specific slot, and may monitor one of search space set #1 and search space set #2 in a specific slot.

In an NR system, an uplink/downlink HARQ adopts an asynchronous HARQ scheme in which a data retransmission time is not fixed. For example, in the case of a downlink, when HARQ NACK is fed back to the base station from the UE with respect to initial transmission data, which is transmitted by the base station, the base station may arbitrarily determine a point of transmission time for data to be retransmitted, according to a scheduling operation. The UE may buffer data determined as an error, as a result of decoding the received data for an HARQ operation, and may then combine the buffered data with the data retransmitted from the base station. HARQ ACK/NACK information of a PDSCH transmitted in a subframe n-k may be transmitted from the UE to the base station through a PUCCH or a PUSCH in a subframe n. In a 5G communication system such as NR, a k value may be transmitted while being included in DCI indicating or scheduling reception of the PDSCH transmitted in the subframe n-k, or may be configured in the UE through a higher layer signal. In this case, the base station may configure one or more k values through a higher layer signal, and may indicate a specific k value through the DCI. In this case, k may be determined according to HARQ-ACK processing capability of the UE, in other words, a minimum time required for the UE to receive the PDSCH, and generate and report the HARQ-ACK for the PDSCH. Also, the UE may use a default value or a predefined value before the k value is configured.

Next, a resource region in which a data channel is transmitted in a 5G communication system will be described.

Figure 5:
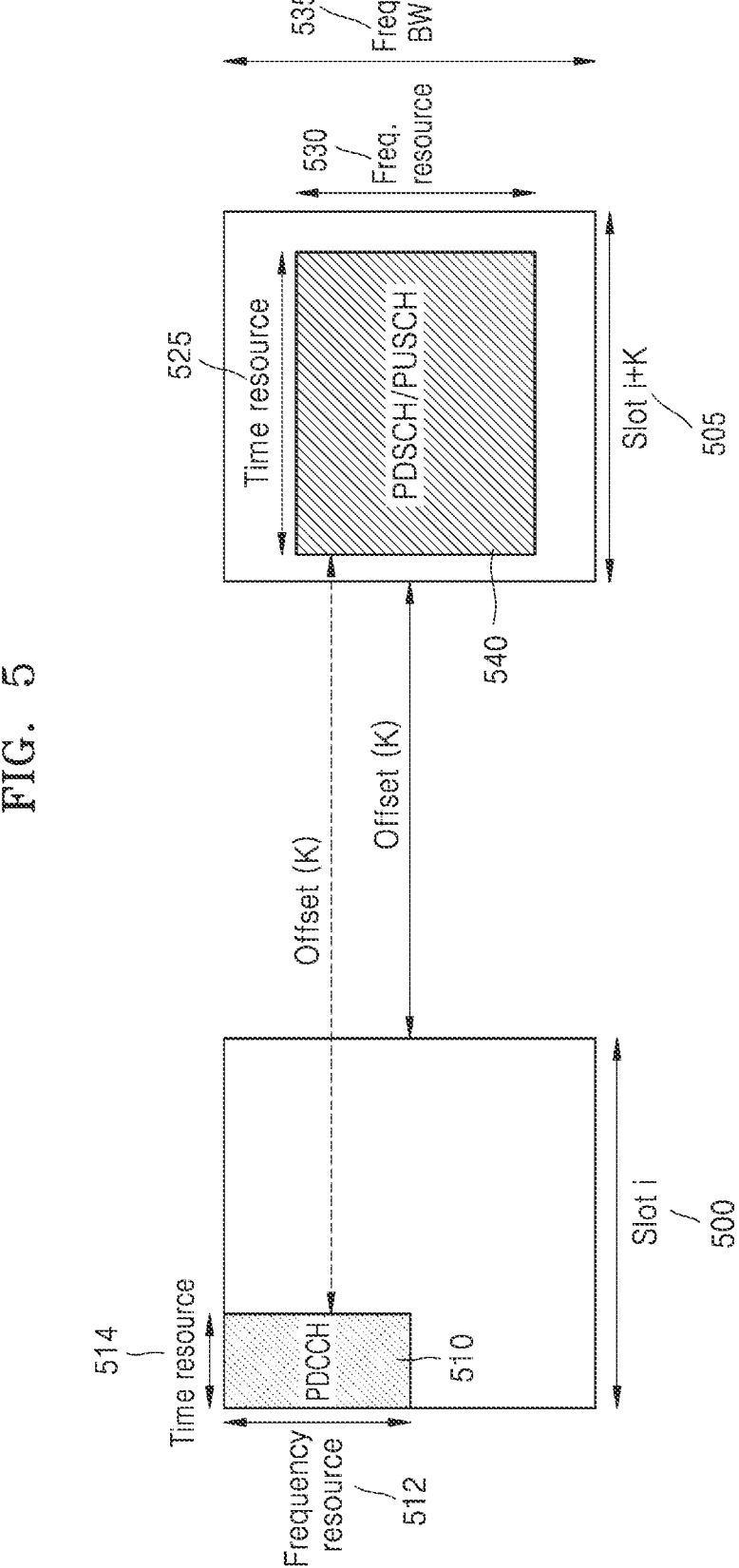
FIG. 5 is a diagram illustrating a downlink or uplink scheduling method and a resource region in an NR system.

FIG. 5 is a diagram illustrating a resource region for data channel transmission in a 5G communication system. A UE may monitor or search for a PDCCH 510 in a downlink control channel (hereinafter, PDCCH) region (hereinafter, a control resource set (CORESET) or a search space (SS)) configured through higher layer signaling from a base station. In this case, the PDCCH region includes time domain information 514 and frequency domain information 512, and the time domain information 514 may be configured in units of symbols whereas the frequency domain information 512 may be configured in units of RBs or RB groups. When the UE detects the PDCCH 510 in a slot i 500, the UE may obtain downlink control information (DCI) transmitted through the detected PDCCH 510. The UE may obtain PDSCH or PUSCH scheduling information from the received DCI. That is, the DCI may include information about a resource region in which the UE needs to receive a PDSCH transmitted from the base station (or a PDSCH transmission region), or information about a resource region allocated by the base station for the UE to transmit a PUSCH. The case where the UE is scheduled for PUSCH transmission will now be described. The UE having received the DCI may obtain a PUSCH reception slot index or offset information K from the DCI, and thus determine a PUSCH transmission slot index. For example, the UE may determine as being scheduled to transmit a PUSCH in a slot i+K 505, based on the received offset information K, based on the slot i 500 in which the PDCCH 510 is received. In this case, the UE may determine the slot i+K 505 or a PUSCH start symbol or time in the slot i+K 505, based on the received offset information K with respect to a CORESET in which the PDCCH 510 is received. In addition, the UE may obtain information about a PUSCH transmission time-frequency resource region 540 in the PUSCH transmission slot 505, from the DCI. In this case, PUSCH transmission frequency resource region information 530 may be group unit information of PRBs or PRG groups. The PUSCH transmission frequency resource region information 530 is information about a region included in an initial bandwidth (BW) or an initial bandwidth part (BWP) determined by or configured for the UE through an initial access procedure. When the UE is configured with a BW or a BWP through higher layer signaling, the PUSCH transmission frequency resource region information 530 is information about a region included in the BW or the BWP configured through higher layer signaling.

PUSCH transmission time resource region information 525 may be symbol or symbol group unit information, or information indicating absolute time information. In this case, the PUSCH transmission time resource region information 525 may be represented as a combination of a PUSCH transmission start time or symbol and a PUSCH length or a PUSCH end time or symbol and be included in the DCI as one field or value. In this case, the PUSCH transmission time resource region information 525 may be included in the DCI as a field or value for representing the PUSCH transmission start time or symbol and the PUSCH length or the PUSCH end time or symbol. The UE may transmit the PUSCH in a PUSCH transmission resource region 540 determined based on the DCI.

Hereinafter, a method of assigning a frequency domain resource for a data channel in a 5G communication system will be described.

In 5G, three types are supported as a method of indicating frequency domain resource allocation information for a downlink data channel (PDSCH) and an uplink data channel (PUSCH). For example, the three types include resource allocation type 0, resource allocation type 1, and resource allocation type 2.

Resource Allocation Type 0

RB allocation information may be notified from the base station to the UE in the form of a bitmap for a resource block group (RBG). In this case, the RBG may include a set of consecutive virtual RBs (VRBs), and a size P of the RBG may be determined based on a value configured as a higher layer parameter (rbg-Size) and a BWP size defined in the following table.

TABLE 12

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

The total number $N_{RBG}$ of RBGs of a BWP i with a size of $$N_{BWP,i}^{size}$$

may be defined as follows.

$$N_{RBG} = \left\lceil \left(N_{BWP,i}^{size} + \left(N_{BWP,i}^{start} \bmod P\right)\right) / P \right\rceil, \text{ where}$$

the size of the first RBG i $$RBG_0^{size} = P - N_{BWP,i}^{start} \bmod P$$

the size of last RBG is $$RBG_{last}^{size} =$$
$$\left(N_{BWP,i}^{start} + N_{BWP,i}^{size}\right)\bmod P \text{ if } \left(N_{BWP,i}^{start} + N_{BWP,i}^{size}\right)\bmod P > 0 \text{ and } P \text{ otherwise.}$$

the size of all other RBGs is P.

Each bit of the bitmap with the size of $N_{RBG}$ bits may correspond to each RBG. RBGs may be indexed in the order of increasing frequency, starting from a lowest frequency position of the BWP. For $N_{RBG}$ RBGs in the BWP, RBG #0 to RBG #($N_{RBG}-1$) may be mapped from the most significant bit (MSB) to the least significant bit (LSB) of the RBG bitmap. When a specific bit value in the bitmap is 1, the UE may determine that the RBG corresponding to the bit value is allocated, and when a specific bit value in the bitmap is 0, the UE may determine that the RBG corresponding to the bit value is not allocated.

Resource Allocation Type 1

RB allocation information may be notified from the base station to the UE as information about the start position and length of the consecutively allocated VRBs. In this case, interleaving or non-interleaving may be additionally applied to the consecutively allocated VRBs. A resource allocation field of resource allocation type 1 may include a resource indication value (RIV), and the RIV include the start point $RB_{start}$ of the VRB and the length $L_{RBs}$ of the consecutively allocated RBs. In more detail, the RIV in the BWP with the size of $$N_{BWP}^{size}$$

may be defined as follows.

if $$(L_{RBs} - 1) \leq \left\lfloor N_{BWP}^{size} / 2 \right\rfloor$$

then, $$RIV = N_{BWP}^{size}(L_{RBs} - 1) + RB_{start}$$

else $$RIV = N_{BWP}^{size}\left(N_{BWP}^{size} - L_{RBs} + 1\right) + \left(N_{BWP}^{size} - 1 - RB_{start}\right)$$

where $L_{RBs} \geq 1$ and shall not exceed $$N_{BWP}^{size} - RB_{start}$$

Resource Allocation Type 2

RB allocation information may be notified from the base station to the UE as a set of M interlace indexes.

An interlace index m∈{0, 1, . . . , M−1}: may include common RBs {m, M+m, 2M+m, 3M+i, . . . }, and M may be defined as shown in Table 8.

TABLE 13

| μ | M |
| --- | --- |
| 0 | 10 |
| 1 | 5 |

A relationship between the common RB $$n_{CRB}^{\mu}$$

and the RB $$n_{IRB,m}^{\mu} \in \{0, 1, ...\}$$

in the interlace m and the BWP i may be defined as follows.

$$n_{CRB}^{\mu} = Mn_{IRB,m}^{\mu} + N_{BWP,i}^{start} + \left((m - N_{BWP,i}^{start,\mu}) \bmod M\right),$$

where $$N_{BWP,i}^{start,\mu}$$

is the common resource block where BWP starts relative to common resource block 0. μ is subcarrier spacing index.

When the subcarrier spacing is 15 kHz ($\mu$=0), RB allocation information for the interlace set may be notified from the base station to the UE by $m_0$+l indexes. Also, the resource allocation field may include an RIV. When the RIV is 0≤RIV<M (M+1)/2, l=0, 1, . . . . L−1, the number of interlaces consecutive to a start interlace $m_0$ may be L(L≥1), and the value is as follows.

if (L−1)≤⌊M/2⌋ then

RIV=M(L−1)+$m_0$ else

RIV=M(M−L+1)+(M−1−$m_0$)

When the RIV is RIV≥M(M+1)/2, the RIV may include the start interlace index $m_0$ and l values, and may be configured as shown in Table 14.

TABLE 14

| RIV − M(M + 1)/2 | $m_0$ | l |
|---|---|---|
| 0 | 0 | {0, 5} |
| 1 | 0 | {0, 1, 5, 6} |
| 2 | 1 | {0, 5} |
| 3 | 1 | {0, 1, 2, 3, 5, 6, 7, 8} |
| 4 | 2 | {0, 5} |
| 5 | 2 | {0, 1, 2, 5, 6, 7} |
| 6 | 3 | {0, 5} |
| 7 | 4 | {0, 5} |

When the subcarrier spacing is 30 kHz ($\mu$=1), RB allocation information may be notified from the base station to the UE in the form of a bitmap indicating interlaces allocated to the UE. The size of the bitmap is M, and 1 bit of the bitmap corresponds to an interlace. The order of the interlaced bitmap may be mapped from the MSB to the LSB, that is, from interlace index 0 to interlace index M−1.

Next, a beam configuration method in order for the base station to transmit control information and data to the UE will be described. In the disclosure, for the convenience of explanation, a process of transmitting control information on a PDCCH may be expressed as "transmitting the PDCCH," and a process of transmitting data on a PDSCH may be expressed as "transmitting the PDSCH."

Reference numeral 6-50 shows an example of a MAC-CE structure for activating the TCI state of the PDCCH. The definition of each field in the MAC CE and available values for each field are as follows.

- Serving Cell ID : This field indicates the identity of the Serving Cell for which the MAC CE applies. The length of the field is 5 bits;
- CORESET ID : This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;
- TCI State ID : This field indicates the TCI state identified by TCI-StateId as specified in TS 38.331 [5] applicable to the Control Resource Set identified by CORESET ID field. If the field of CORESET ID is set to 0, this field indicates a TCI- StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

Next, a beam configuration method for a PDSCH will be described. FIG. 7 is a diagram illustrating a process of configuring and activating a beam of a PDSCH. A list of TCI states for a PDSCH may be indicated through a higher layer list such as RRC (7-00). The list of TCI states may be indicated by, for example, "tci-StatesToAddModList" and/or "tci-StatesToReleaseList" in PDSCH-Config IE for each BWP. Next, some of the TCI states in the list may be activated through MAC-CE (7-20). The maximum number of activated TCI states may be determined according to capability reported by the UE. Reference numeral 7-50 shows an example of a MAC-CE structure for activation/deactivation of the TCI state of the PDSCH based on Rel-15.

The definition of each field in the MAC CE and available values for each field are as follows.

- Serving Cell ID : This field indicates the identity of the Serving Cell for which the MAC CE applies. The length of the field is 5 bits;
- BWP ID : This field indicates a DL BWP for which the MAC CE applies as the codepoint of the DCI bandwidth part indicator field as specified in TS 38.212 [9]. The length of the BWP ID field is 2 bits;
- Ti : If there is a TCI state with TCI-StateId i as specified is TS 38.331 [5], this field indicates the activation/deactivation status of the TCI state with TCI-StateId i, otherwise MAC entity shall ignore the Ti field. The Ti field is set to 1 to indicate that the TCI sate with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with Ti field set to 1 shall be mapped to the codepoint value 0, second TCI State with Ti field set to 1 shall be mapped to the codepoint value 1 and so on. The maximum number of activated TCI states is 8;
- R : Reserved bit, set to 0.

Firstly, a beam configuration method for a PDCCH will be described. FIG. 6 is a diagram illustrating a process of configuring and activating a beam of a PDCCH.

Firstly, a list of TCI states for each CORESET may be indicated through a higher layer list such as RRC (6-00). The list of TCI states may be indicated by "tci-StatesPDCCH-ToAddList" and/or "tci-StatesPDCCH-ToReleaseList" in Table 8. Next, one of the TCI states in the list configured for each CORESET may be activated through MAC-CE (6-20).

When the UE receives DCI format 1_1 or DCI format 1_2, a PDSCH may be received by one beam among the TCI states activated through the MAC-CE, based on information of a transmission configuration indication (TCI) field in DCI (7-40). The presence or absence of the TCI field may be determined by "tci-PresentinDCI," which is a higher layer parameter in the CORESET configured for reception of the DCI. When "tci-PresentinDCI" is configured as "enabled" in the higher layer, the UE may identify the TCI field having 3 bits of information, and may determine a direction of a beam associated with the TCI state activated on a DL BWP or a scheduled component carrier and a DL-RS.

In LTE and NR, the UE performs a procedure of reporting capability supported by the UE to a serving base station while being connected to the base station, which will be referred to as "UE capability (reporting)" in the following description. The base station may transmit a UE capability enquiry message requesting capability reporting to the UE in a connected state. The message may include a request for UE capability for each RAT type by the base station. The request for each RAT type may include information about a requested frequency band. In addition, the UE capability enquiry message may be transmitted while requesting a plurality of RAT types through a single RRC message container, or a plurality of UE capability enquiry messages including requests for respective RAT types may be included to then be transmitted to the UE. That is, the UE capability enquiry may be repeated multiple times, and the UE may configure a UE capability information message corresponding thereto, and may report the same multiple times. In a next-generation mobile communication system, the request for UE capability may be performed for MR-DC, as well as NR, LTE, and EN-DC. For reference, the UE capability enquiry message is generally transmitted in an initial stage after the UE is connected, but the base station is able to request the UE capability under any condition as necessary.

In the above operation, the UE receiving the request for reporting UE capability from the base station configures UE capability according to an RAT type and band information requested by the base station. A method of configuring UE capability by the UE in an NR system will be summarized below.

1. When the UE receives a list of LTE and/or NR bands through a UE capability request from the base station, the UE configures a band combination (BC) for EN-DC and NR stand-alone (SA). That is, the UE may configure a list of BC candidates for EN-DC and NR SA, based on the bands requested to the base station using "FreqBandList." In addition, the bands have priority in the order as described in "FreqBandList."

2. When the base station requests a UE capability report by setting "eutra-nr-only" flag or "eutra" flag, the UE may completely remove NR SA BCs from the configured list of BC candidates. This operation may be performed only when an LTE base station (eNB) requests "eutra" capability.

3. Thereafter, the UE may remove fallback BCs from the list of BC candidates configured in the above operation. The fallback BC corresponds to the case where a band corresponding to at least one SCell is removed from a certain super set BC, and the fallback BC may be omitted because the super set BC is capable of covering the fallback BC. This operation may also be applied to MR-DC, i.e., LTE bands. The remaining BCs after this operation constitute a final "candidate BC list."

4. The UE may select the BCs to be reported, which conform to the requested RAT type, from the final "candidate BC list." In this operation, the UE may configure "supportedBandCombinationList" in a pre-determined order. In other words, the UE may configure the BCs and UE capability to be reported in the preconfigured order of the RAT types. (nr→eutra-nr→cutra). In addition, the UE may configure "featureSetCombination" for the configured "supportedBandCombinationList" and may configure a list of "candidate feature set combinations" from the candidate BC list from which the list of the fallback BCs (including capabilities in the equal or lower level) is removed. The "candidate feature set combination" may include the feature set combinations for BCs both of NR and EUTRA-NR, and may be obtained from the feature set combinations of the "UE-NR-Capabilities" and "UE-MRDC-Capabilities" containers.

5. In addition, when the requested RAT type is "eutra-nr" and has effects, "featureSetCombinations" may be included in both containers of "UE-MRDC-Capabilities" and "UE-NR-Capabilities." However, the feature set of NR may be included only in "UE-NR-Capabilities."

After the UE capability is configured, the UE may transmit a UE capability information message including the UE capability to the base station. Then, the base station may perform appropriate scheduling and transmission/reception management for the UE, based on the UE capability received from the UE.

Meanwhile, when an interval between a symbol on which transmission of a PDCCH ends and a start symbol of a PDSCH scheduled by the PDCCH is less than a specific threshold, the UE may not complete decoding of the PDCCH at the time of receiving the PDSCH. This means that beam information for the reception of the PDSCH, which is indicated by DCI of the PDCCH, fails to be received. In this situation, the base station and the UE may specify a default beam for the reception of the PDSCH. That is, in the above situation, the base station transmits the PDSCH using the specified default beam, and the UE performs buffering using the specified default beam. When the UE determines, after decoding of the PDCCH, that there is a PDSCH scheduled before decoding of the PDCCH, the decoding of the PDSCH may be performed from a signal buffered according to the default beam. In this case, the aforementioned threshold may be "timeDurationForQCL" reported as UE capability. Meanwhile, the above default beam operation may be limited to the case where one or more TCI states in the TCI state list 7-00 configured for the PDSCH include "QCL-TypeD," that is, the case where the reception beam of the UE is configured. In this case, the default beam may be a beam configured in a CORESET (e.g., CORESET #0) corresponding to a lowest ID, among CORESETs corresponding to a monitored search space of a latest slot, based on a PDSCH reception slot.

The default beam operation for receiving the PDSCH may be limited to the case where cross-carrier configuration is not supported for the PDSCH.

Figure 8:
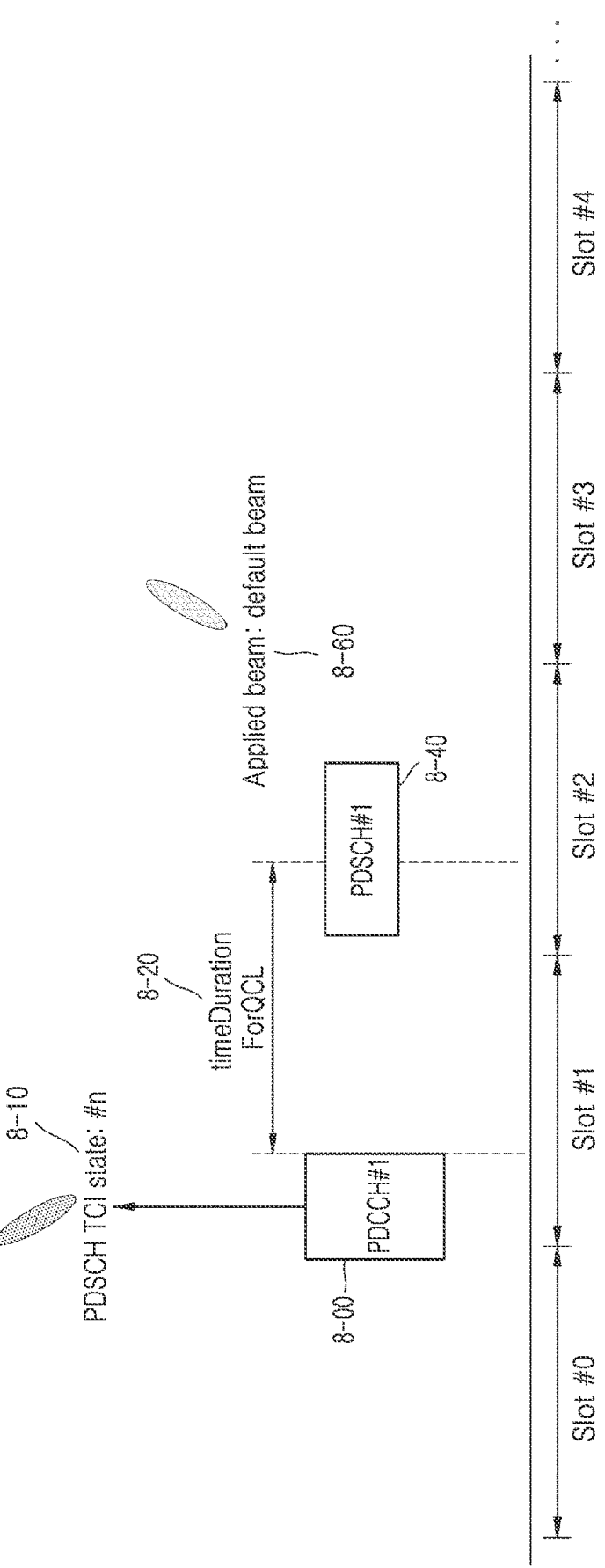
FIG. 8 is a diagram illustrating a PDSCH default beam operation, according to an embodiment of the disclosure.

FIG. 8 is a diagram illustrating a PDSCH default beam operation. In the case where a TCI field for reception of a PDSCH, in DCI 8-00 transmitted through a PDCCH, indicates TCI state #n 8-10, when an interval between a symbol on which transmission of the PDCCH ends and a start symbol of a PDSCH 8-40 scheduled by the PDCCH is less than "timeDurationforQCL" 8-20 and one or more TCI states in a TCI state list configured through RRC for the PDSCH include "QCL-TypeD," a default beam 8-60 may be applied to the PDSCH.

Meanwhile, when "tci-PresentinDCI" is not configured in a CORESET, or when the PDSCH is scheduled in DCI format 1_0, because there is no TCI field in the DCI, the UE is unable to receive an indication of a beam for reception of the PDSCH using the DCI. In this case, when the interval between the symbol on which the transmission of the PDCCH ends and the start symbol of the PDSCH scheduled by the PDCCH is greater than or equal to the value "timeDurationForQCL," the UE may assume that a beam for reception of the PDSCH is the same as a beam configured/activated in the PDCCH transmission CORESET, and the base station may configure a PDSCH transmission beam according to the assumption of the UE. The default beam operation for reception of the PDSCH may be limited to the case where cross-carrier configuration is not supported for the PDSCH.

Next, configuration of cross-carrier scheduling for a PDSCH will be described. For cross-carrier scheduling, a configuration parameter for each serving cell configured through RRC, that is, "crossCarrierSchedulingConfig" having the following structure may be configured in "Serving-CellConfig IE" configured for each serving cell/component carrier (CC).

```
CrossCarrierSchedulingConfig ::= SEQUENCE {
    schedulingCellInfo CHOICE {
        own SEQUENCE{ -- Cross carrier scheduling: scheduling cell
            cif-Presence BOOLEAN
        },
        other SEQUENCE{ -- Cross carrier scheduling: scheduled cell
            schedulingCellId ServCellIndex,
            cif-InSchedulingCell INTEGER (1..7)
        }
    },
    ...
}
```

In the case of performing cross-carrier scheduling from a specific serving cell to another serving cell, the specific serving cell may be referred to as a "scheduling cell" for convenience, and the value "cif-Presence" in the own value of the parameter "crossCarrierSchedulingConfig" may be configured to be true. In this case, a carrier indicator field (CIF), which has been described, may exist in DCI format 0_1 or 1_1 of the scheduling cell. When the CIF indicates a value of 0, a PDSCH scheduled in the DCI format is transmitted in the scheduling cell. On the other hand, when the CIF indicates a non-zero value, a PDSCH scheduled in the DCI format is transmitted in a serving cell other than the scheduling cell. The serving cell corresponding to the value of the CIF may be referred to as a "scheduled cell" for convenience, and mapping between a specific scheduled cell and the CIF value may be performed through the value "cif-InSchedulingCell" in "other" of the parameter "cross-CarrierSchedulingConfig." That is, when the value "cif-InSchedulingCell" is configured in "ServingCellConfig" of a specific scheduled cell, transmission of the PDSCH through the scheduled cell may be indicated to the UE by configuring the CIF value in the DCI of the scheduling cell as the value "cif-InSchedulingCell." There may be only one scheduling cell for a specific scheduled cell, and the indication of the scheduling cell for the specific scheduled cell may be performed by specifying the value "schedulingCel-lId" in "other" of the parameter "crossCarrierScheduling-Config" in "ServingCellConfig" for the scheduled cell as an ID of the scheduling cell. In addition, for configuration of cross-carrier scheduling, a search space set having the same ID may be required to be configured between an active BWP of the scheduling cell and an active BWP of the scheduled cell.

In the above-described cross-carrier scheduling, scheduling may be possible only for one cell in one DCI format. Accordingly, one or more DCI formats are required to schedule one or more cells, and thus, when PDCCH transmission is limited, it may be difficult to schedule one or more cells. Accordingly, a method of scheduling one or more cells in one DCI format needs to be proposed. In the disclosure, a method of configuring DCI and determining and interpreting a DCI field when one or more cells are scheduled in one DCI will be described.

Although a wireless communication system and a method and apparatus according to embodiments of the disclosure have been described based on an NR system, the disclosure is not limited to the NR system and may be applied to various wireless communication systems such as LTE, LTE-A, LTE-A-Pro, and 5G. Also, although the disclosure has been described based on a system and device that transmit and receive a signal by using a licensed band, the disclosure may also be applied to a system operating in an unlicensed band. Also, although the description has been made based on a cell for convenience of explanation, the description may be applied to a method of operating one or more bandwidths such as a plurality of BWPs or subbands.

Hereinafter, in the disclosure, higher layer signaling or a higher layer signal is a signal transmission method by which the base station transmits a signal to the UE by using a downlink data channel of a physical layer, or the UE transmits a signal to the base station by using an uplink data channel of a physical layer, and includes a method of transmitting a signal through radio resource control (RRC) signaling, packet data convergence protocol (PDCP) signaling, or media access control (MAC) control element (CE). The higher layer signaling or the higher layer signal may include system information commonly transmitted to a plurality of UEs, for example, a system information block (SIB).

Embodiment 1

In the present embodiment, a method and apparatus by which, in a UE and a base station capable of scheduling a plurality of cells through one DCI, the base station configures downlink control information and the UE interprets and determines control information included in a control channel received from the base station will be described.

Figure 9:
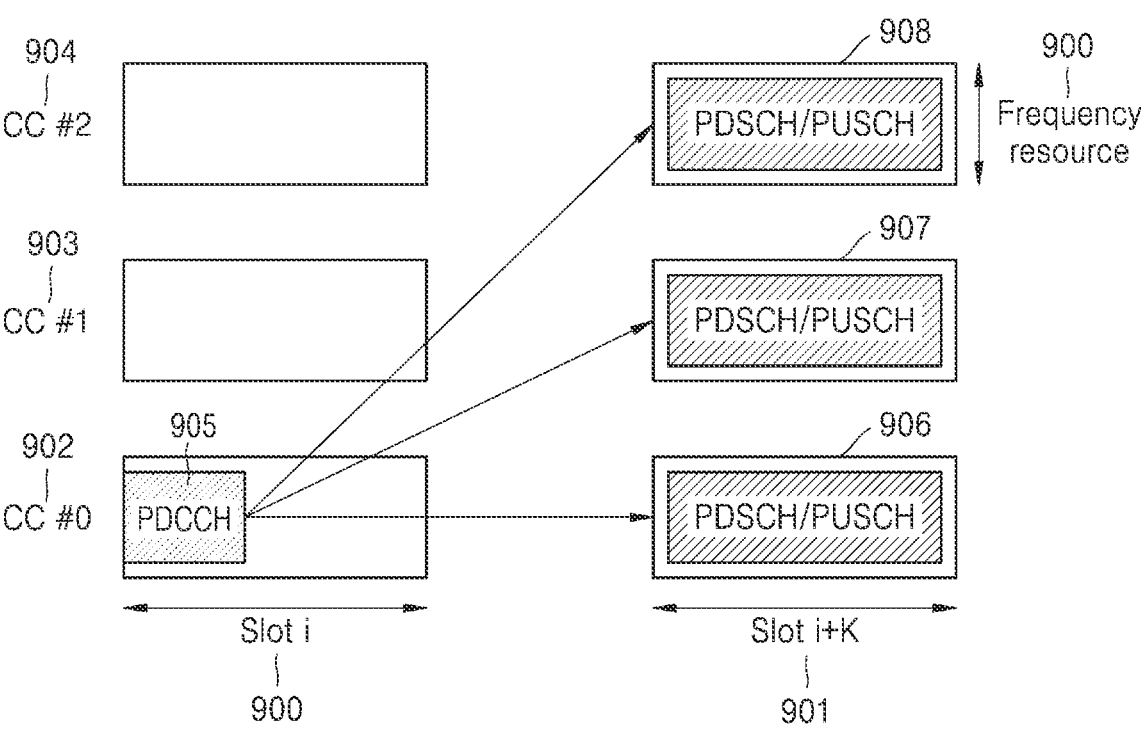
FIG. 9 is a diagram illustrating an example, according to an embodiment of the disclosure.

The UE may report, to the base station, UE capability information indicating that the UE supports downlink (or uplink) scheduling (the following description will be made assuming downlink scheduling for convenience of explanation, but may be applied to uplink scheduling) in a plurality of cells through one DCI. The base station may configure, in the UE, an operation of scheduling a plurality of cells through one DCI, through higher layer signaling. In this case, the base station may configure, in the UE, scheduled cell information, cell group information, etc., through higher layer signaling, which will be described with reference to FIG. 9. The base station may schedule PDSCH/PUSCHs 906, 907, and 908 in a plurality of cells 902, 903, and 904 through one DCI 905. In this case, the DCI 905 may indicate only the cells 903 and 904 other than the scheduling cell 902 in which the DCI 905 is transmitted, and in this case, the UE may determine that the cell in which the DCI 905 is transmitted and the other cells 903 and 904 are scheduled. A method of configuring DCI for scheduling a plurality of cells will be described below in detail.

Embodiment 1-1

The base station may configure DCI for scheduling a plurality of cells in a specific DCI format. When the UE receives the specific DCI format, the UE may determine that the DCI is the DCI for scheduling a plurality of cells. In order to notify the DCI format for scheduling a plurality of cells to the UE, the base station may include an indicator for indicating the DCI format in a DCI field. In this case, the generation and size of the DCI field may be configured or changed through higher layer signaling for multiple cell scheduling configuration. In another method, the base station may scramble a CRC with a specific RNTI in order to indicate the DCI format for scheduling a plurality of cells. When the indicator for indicating the DCI format indicates that DCI is the received DCI for scheduling a plurality of cells, or a specific RNTI is used in CRC scrambling during CRC decoding, the UE may determine that the DCI schedules a plurality of cells. In another method, the base station may configure the UE with a separate CORESET and search space for the UE to monitor DCI indicating a plurality of cells. For example, the UE may determine that a PDCCH monitored in a CORESET having a specific CORESET index or in a CORESET associated with a specific search space index includes control information that schedules a plurality of cells.

Embodiment 1-2

In the present embodiment, a method by which the base station schedules a plurality of cells through one DCI and a method by which the UE determines and interprets the DCI will be described.
Method 1
The base station may designate a plurality of cells as a group through higher layer signaling and may configure the group in the UE. When a plurality of cells are scheduled through one DCI, the base station may indicate a group in which a plurality of configured to the UE. In this case, regarding a group indicator in a DCI field, when higher layer signaling for multiple cell scheduling or cell group generation is configured, a CIF may be re-used (or changed), or a cell group indicator may be generated. In this case, when the cell group indicator includes a bitmap, a lowest (or highest) group index may be mapped beginning from a first bit, and then a group index may be mapped in an ascending order (or descending order). Also, the first bit may be mapped from a first cell group index configured through higher layer signaling. In another method, a lowest (or highest) group index may be mapped beginning from a lowest codepoint, and then a group index may be mapped to a codepoint in an ascending order (or descending order). For example, when group indexes #0, #1, #2, and #3 are configured, codepoint 00 may be mapped beginning from group #0. Also, a lowest codepoint may be mapped beginning from a first cell group index configured through higher layer signaling. In another method, a cell group indicator value may be configured through a higher layer. The UE receiving DCI including a field indicating a cell group may determine that the DCI schedules a plurality of cells indicated by a cell group indicator. For example, cell #0 and cell #1 may be configured for cell group #0 through higher layer signaling, and when the base station indicates cell group #0 through DCI, the UE receiving the DCI may determine that downlink or uplink transmission is scheduled in cell #0 and cell #1.
Method 2
The base station may configure, in the UE, [X] cells for scheduling a plurality of cells through higher layer signaling. The base station may indicate, to the UE, a plurality of cells to be scheduled from among the configured [X] cells in a bitmap in DCI, and a size of the bitmap may be the number of cells, that is, [X], configured through higher layer signaling. In the bitmap, a first bit may be mapped to a lowest (or highest) cell index, and a next bit may be mapped in an ascending order (or descending order) of a cell index. Alternatively, the first bit may be mapped from a first cell index configured through higher layer signaling. The UE receiving the DCI including the bitmap indicating the plurality of cells to be scheduled may determine that a cell whose bit is 1 (or 0) is scheduled. For example, when the bitmap indicating the plurality of cells to be scheduled in the DCI received by the UE indicates 1 1 0 0, and bits of the bitmap respectively indicate cell #0, cell #1, cell #2, and cell #3 through higher layer configuration, the UE may determine that cell #0 and cell #1 are scheduled. When all of the plurality of cells configured by the base station through higher layer signaling are scheduled, the bitmap may be omitted.
Method 3
The base station may designate a plurality of cells as a group through higher layer signaling and may configure the group in the UE. In this case, the base station may indicate one or more cells to be scheduled form among the cells in the configured group to the UE in a bitmap in DCI. A size of the bitmap may be determined based on the number of cells included in the cell group configured through higher layer signaling. In the bitmap, a first bit may be mapped to a lowest (or highest) cell index in the cell group, and a next bit may be mapped in an ascending order (or descending order) of a cell index. Alternatively, the first bit may be mapped from a first cell index in the cell group configured through higher layer signaling. The base station may configure a cell group indicator and the bitmap indicating the cells to be scheduled in the group as separate fields and may include the fields in the DCI, or may configure the same as one field and may indicate the field to the UE. When the cell group indicator and the bitmap indicating the cells to be scheduled in the group are configured as one field, the UE may determine that MSB (or LSB) values indicate the cell group indicator and the remaining bits constitute the bitmap indicating the cells to be scheduled in the group. Sizes of the cell group indicator and the bitmap fields may be determined based on configured higher layer signaling. The UE receiving the DCI including the cell group and the bitmap indicating the cells to be scheduled in the cell group may determine that a cell whose bit in the bitmap is 1 (or 0) from among the cells configured in the cell group is scheduled.
Method 4
When the base station configures, in the UE, an operation of scheduling a plurality of cells through higher layer signaling, the base station may schedule both a cell indicated by a CIF included in DCI and a cell on which the DCI is transmitted. The UE receiving the DCI may determine that the cell in which the DCI is received and the cell indicated by the CIF of the DCI are scheduled.

Embodiment 2

In the present embodiment, a method and apparatus by which in a UE and a base station capable of scheduling a plurality of cells through one DCI, the base station configures downlink control information and the UE interprets and determines control information included in a control channel received from the base station will be described. In more detail, a method by which when the base station schedules a PDSCH in a plurality of cells through one DCI, the base station configures a beam for the PDSCH of the plurality of cells, that is, a TCI state, and a method by which the UE determines the TCI state based on the received DCI will be described.

Embodiment 2-1

The base station may configure each TCI state for each of cells through higher layer signaling (e.g., RRC). The base station may activate some of a TCI state list of each cell configured through higher layer signaling, through MAC-CE. In this case, when the base station configures the TCI state list activated through MAC-CE and a codepoint of DCI for indicating a corresponding TCI state through the DCI, the base station may map a plurality of cells to one codepoint. In this case, lowest TCI state IDs from among TCI states configured through higher layer signaling in each cell may be mapped to a lowest codepoint. For example, a codepoint and a TCI state ID may be mapped as shown in Table 15.

TABLE 15

| Codepoint (DCI) | Cell #0 | Cell #1 | Ceell #2 |
|---|---|---|---|
| 000 | TCI state#0 | TCI state#10 | TCI state#0 |
| 001 | TCI state#1 | TCI state#12 | TCI state#9 |
| 010 | TCI state#2 | TCI state#15 | TCI state#10 |
| 011 | TCI state#3 | TCI state#17 | TCI state#11 |
| 100 | TCI state#4 | TCI state#18 | TCI state#12 |
| 101 | TCI state#5 | TCI state#19 | TCI state#16 |
| 110 | TCI state#6 | TCI state#23 | TCI state#20 |
| 111 | TCI state#7 | TCI state#25 | TCI state#40 |

When the base station maps TCI states of a plurality of cells to one codepoint through MAC-CE, the plurality of cells may be all cells configured by the base station or may be one or more cells separately configured to schedule a plurality of cells through one DCI. The UE receiving the DCI for scheduling the plurality of cells from the base station may determine that TCI state information of each scheduled cell means a TCI state mapped to the cell at a codepoint of a TCI field in the DCI. When there is a TCI field value in the DCI for scheduling the plurality of cells received from the base station, the UE may perform PDSCH decoding (e.g., QCL assumption during DRMS decoding) scheduled for each cell based on multiple cell information scheduled through DCI or higher layer configuration and TCI state information of each cell mapped to an indicated TCI field value (codepoint). For example, when a TCI field value in Table 15 is 000 and the base station schedules cell #0 and cell #1 in Table 15, the UE may decode a PDSCH of each cell based on QCL assumption configured in TCI state #0 and TCI state #10 for cell #0 and cell #1. When TCI state information corresponding to a scheduling cell is not mapped to a TCI field value indicated by the base station in the DCI, the UE may assume TCI state configuration as a lowest index from among TCI state indexes activated through MAC-CE for the cell from the base station and may perform PDSCH decoding.

When there is a TCI field in the DCI for scheduling the plurality of cells received from the base station but an interval between a symbol on which transmission of a PDCCH ends and a start symbol of a PDSCH scheduled by the PDCCH is equal to or less than timeDurationforQCL configured through higher layer signaling and UE capability, the UE requires assumption for beam (TCI state) assumption for receiving the PDSCH. A method for configuring a beam (TCI state) for PDSCH reception during scheduling of a plurality of cells will be described in detail.
Method 1

The base station may configure timeDurationforQCL for each cell through higher layer signaling. When a plurality of cells are scheduled through one DCI, and an interval between a symbol on which transmission of a PDCCH ends and a start symbol of a PDSCH of all cells scheduled by the PDCCH is equal to or less than timeDurationforQCL configured for each cell, the UE may assume TCI state information indicated by a lowest codepoint and may perform PDSCH decoding.
Method 2

The base station may configure timeDurationforQCL for each cell through higher layer signaling. When a plurality of cells are scheduled through one DCI, and an interval between a symbol on which transmission of a PDCCH ends and a start symbol of a PDSCH of some cells scheduled by the PDCCH is equal to or less than timeDurationforQCL configured for each cell, the UE may assume TCI state information indicated by a lowest codepoint and may perform PDSCH decoding. In another method, when a cell is equal to or less than timeDurationforQCL between a symbol on which transmission of a PDCCH ends and a start symbol of a PDSCH scheduled by the PDCCH or the cell is a primary cell in which the DCI is transmitted, the UE may assume TCI state configuration configured to a lowest CORESET ID configured for the cell in which the DCI is transmitted and may perform PDSCH decoding. In another method, for a cell (or a serving cell through which the DCI is not transmitted) that is equal to or less than timeDurationforQCL between a symbol on which transmission of a PDCCH ends and a start symbol of a PDSCH scheduled by the PDCCH, the UE may assume TCI state configuration having a lowest index from among activated TCI states in the cell and may perform PDSCH decoding. In another method, for a cell that is equal to or less than timeDurationforQCL between a symbol on which transmission of a PDCCH ends and a start symbol of a PDSCH scheduled by the PDCCH, the UE may perform PDSCH decoding by referring to a TCI state indicated by a lowest codepoint. In another method, when one DCI schedules a plurality of cells, the UE may perform PDSCH decoding by referring to a TCI state indicated by a codepoint indicated in the DCI regardless of whether a cell is equal to or less than timeDurationforQCL.
Method 3

The base station may configure timeDurationforQCL for each cell through higher layer signaling. When one DCI schedules a plurality of cells, the UE may determine validity of a TCI indicator in the DCI with a largest value from among timeDurationforQCL values configured through higher layer signaling. For example, when an interval between a symbol on which transmission of a PDCCH ends and a start symbol of a PDSCH of some cells scheduled by the PDCCH is greater than the largest value from among the timeDurationforQCL values configured through higher layer signaling for each cell, the UE may receive PDSCH decoding received in one or more scheduled cells, based on TCI state information indicated by the TCI indicator.

In another method, the UE may determine validity of a TCI indicator in DCI by using a maximum value from among timeDurationforQCL values configured in a plurality of cells scheduled through one DCI.

Embodiment 2-2

The base station may configure a TCI state to be commonly applied to a plurality of cells through higher layer signaling (e.g., RRC). The base station may activate some of a TCI state list commonly configured through higher layer signaling, through MAC-CE. In this case, when one DCI schedules a plurality of cells, the activated TCI state list may be commonly applied to each cell. In another method, the UE may commonly apply, to a plurality of cells, a TCI state that is activated (or configured) in a lowest (or highest) cell index. According to another example, the UE may commonly apply a TCI state list that is activated (or configure) in a cell in which DCI is transmitted, to other cells. When there is a TCI field value in DCI that schedules one or more cells received by the UE from the base station and an interval between a symbol on which transmission of a PDCCH ends and a start symbol of a PDSCH scheduled by the PDCCH is greater than timeDurationforQCL, the UE may receive PDSCH decoding in the one or more scheduled cells based on TCI state information indicated by the TCI field value.

When there is a TCI field in DCI that schedules one or more cells received by the UE from the base station, but an interval between a symbol on which transmission of a PDCCH ends and a start symbol of a PDSCH scheduled by the PDCCH is equal to or less than timeDurationforQCL configured through higher layer signaling and UE capability, the UE requires assumption for configuring a beam (TCI state) for PDSCH reception, and a method thereof will be described in detail.

Method 1

The UE may assume TCI information of a lowest index from among TCI state indexes activated through MAC-CE from the base station and may perform PDSCH decoding. When there is no CORESET configuration in a scheduled cell or the scheduled cell is a cell (e.g., secondary cell) that does not perform DCI monitoring, the UE may assume TCI information of a lowest index from among TCI state indexes activated through MAC-CE from the base station and may perform PDSCH decoding.

Method 2

The UE may assume TCI state configuration configured (or activated) in a CORESET having a lowest index from among CORESETs configured in a scheduled cell (scheduling cell) from the base station and may perform PDSCH decoding. Also, when a scheduled cell performs DCI monitoring (e.g., primary cell) or a CORESET is configured in a scheduling cell, the UE may assume TCI state configuration configured (or activated) in a CORESET having a lowest index from among CORESETs configured in the scheduled cell from the base station and may perform PDSCH decoding.

Embodiment 2-3

The base station may configure each TCI state for each of one more cells through higher layer signaling (e.g., RRC). The base station may activate some of a TCI state list of each cell configured through higher layer signaling, through MAC-CE for each cell. In this case, when the base station configures the TCI state list activated through MAC-CE for each cell and a codepoint of DCI for indicating a corresponding TCI state through the DCI, each cell may be mapped to a separate codepoint in one DCI. Also, a codepoint of the MSB (or LSB) may be a TCI field value of a lowest (or highest) cell index. Also, a position of a codepoint indicating a TCI state of each cell may be configured by the base station through higher layer signaling. For example, when a codepoint for indicating a TCI state of one cell is three bits and one DCI schedules three cells, a TCI state of each cell may be indicated by each 3-bit codepoint in 9-bit information. In this case, a bit size may be determined based on the number of scheduling cells, or may be adjusted or changed according to higher layer configuration for scheduling one or more cells through one DCI. When there is a TCI field value in DCI that schedules one or more cells received by the UE from the base station and an interval between a symbol on which transmission of a PDCCH ends and a start symbol of a PDSCH scheduled by the PDCCH is greater than timeDurationforQCL, the UE may receive PDSCH decoding in the one more scheduled cells based on TCI state information indicated by the TCI field value.

Embodiment 3

In the present embodiment, a method and apparatus by which in a UE and a base station capable of scheduling a plurality of cells through one DCI, the base station configures downlink control information and the UE interprets and determines control information included in a control channel received from the base station will be described. In more detail, a method by which when the base station schedules a PDSCH in a plurality of cells through one DCI, the base station configures a search space will be described. In more detail, a method of determining a carrier index when a CCE index of a search space is determined will be described.

Method 1

When the base station schedules a PDSCH in a plurality of cells through one DCI, the base station may configure a carrier index $n_{CI}$ as 0.

Method 2

When the base station schedules a PDSCH in a plurality of cells through one DCI, the base station may configure a carrier index $n_{CI}$ as a group index.

Method 3

When the base station schedules a PDSCH in a plurality of cells through one DCI, the base station may configure a carrier index $n_{CI}$ as a specific cell index in a group index. The base station may use the carrier index $n_{CI}$ as a lowest (or highest) cell index from among scheduling cells included in the group index.

Method 4

When the base station schedules a PDSCH in a plurality of cells through one DCI, the base station may configure a carrier index $n_{CI}$ as a lowest (or highest) cell index from among cell indexes configured as cross-carriers. When the base station configures separate cell indexes to schedule a plurality of cells, the base station may configure the carrier index $n_{CI}$ as a lowest (or highest) cell index from among the cell indexes.

Method 5

When the base station schedules a PDSCH in a plurality of cells through one DCI, the base station may configure a carrier index $n_{CI}$ as a lowest (or highest) index from among a cell index mapped to a bitmap or a cell index indicated by a first bit in the bitmap.

Method 6

When the base station configures, in the UE, an operation of scheduling a plurality of cells through higher layer signaling, the base station may schedule both a cell indicated by a CIF included in DCI and a cell in which the DCI is transmitted. In this case, the base station may configure a carrier index $n_{CI}$ as a cell index indicated by the CIF.

When the UE decodes DCI that schedules a plurality of cells, the UE may determine $n_{CI}$ as a cell index through any of the above methods or a combination of the above methods and may perform decoding of PDCCH candidates.

Embodiment 4

In the present embodiment, a method and apparatus by which in a UE and a base station capable of scheduling a plurality of cells through one DCI, the base station configures downlink control information and the UE interprets and determines control information included in a control channel received from the base station will be described. In more detail, a method by which when the base station schedules a PDSCH in a plurality of cells through one DCI, the base station allocates an HARQ process number for each PDSCH to be transmitted in the plurality of cells will be described.

In more detail, when the base station schedules a PDSCH in a plurality of cells through one DCI, the base station may allocate only one HARQ process number. The UE may obtain an HARQ process number allocated to the plurality of cells based on one HARQ process number indicated by DCI in pre-determined rules with the base station, and a detailed description thereof will be described.

Method 1

The UE may determine that an HARQ process number included in DCI that schedules a plurality of cells received from the base station is an HARQ process number for a PDSCH transmitted to a cell in which the DCI is transmitted. The UE may determine that an HARQ process number that is increased by 1 from a cell having a lowest (or highest) cell index is allocated to a cell in which the DCI is not transmitted. In this case, when the increased HARQ process number is already in use, the UE may determine that a next HARQ process number is allocated. Also, the UE may determine an allocated HARQ process number through a modulo operation between the increased HARQ process number and the maximum number of HARQ process numbers (e.g., 16).

Method 2

The UE may determine that an HARQ process number included in DCI that schedules a plurality of cells received from the base station is an HARQ process number for a PDSCH transmitted to a cell having a lowest (or highest) cell index. The UE may determine that a PDSCH transmitted to a cell having a next cell index (e.g., a second lowest index) is allocated by increasing the HARQ process number by 1 indicated in the DCI. In this case, when the increased HARQ process number is already in use, the UE may determine that a next HARQ process number is allocated. Also, the UE may determine an HARQ process number allocated to each cell through a modulo operation between the increased HARQ process number and the maximum number of HARQ process numbers.

Method 3

When the base station indicates a scheduled cell based on a bitmap during scheduling of a plurality of cells through one DCI, the UE may determine that an HARQ process number included in the DCI is a value for a first scheduling cell in the bitmap. The UE may determine that a PDSCH transmitted in a next scheduling cell indicated by the bit map is allocated by increasing the HARQ process number by 1 indicated in the DCI. In this case, when the increased HARQ process number is already in use, the UE may determine that a next HARQ process number of the HARQ process number is allocated to a scheduling cell. Also, the UE may determine an HARQ process number allocated to each cell through a modulo operation between the increased HARQ process number and the maximum number of HARQ process numbers.

Method 4

The base station may allocate a separate HARQ process number for each PDSCH transmitted in a plurality of scheduling cells. In this case, the UE may determine that an HARQ process number of a PDSCH transmitted in a lowest (or highest) cell index is allocated from the MSB (or LSB). When the base station indicates a scheduled cell based on a bitmap during scheduling of a plurality of cells through one DCI, the UE may determine that an HARQ process number is allocated in a cell order indicated by each bitmap.

Embodiment 5

In the present embodiment, a method and apparatus by which in a UE and a base station capable of scheduling a plurality of cells through one DCI, the base station configures downlink control information and the UE interprets and determines control information included in a control channel received from the base station will be described. In more detail, a method by which when the base station schedules a PDSCH in a plurality of cells through one DCI, the UE determines a field included in the DCI will be described.

When the UE determines a specific field included in DCI and a corresponding function is not configured through higher layer signaling, the UE may ignore or may not expect a corresponding field value. For example, when the UE is not configured with CBG-based transmission through higher layer signaling from the base station, the UE may ignore a CBG-related field (e.g., CBGTI field) in DCI or may not expect reception. In another example, when the UE is not configured with BWP change-related higher layer signaling from the base station, the UE may ignore a BWP-related field (e.g., BWP indicator) in DCI or may not expect reception.

Figure 10:
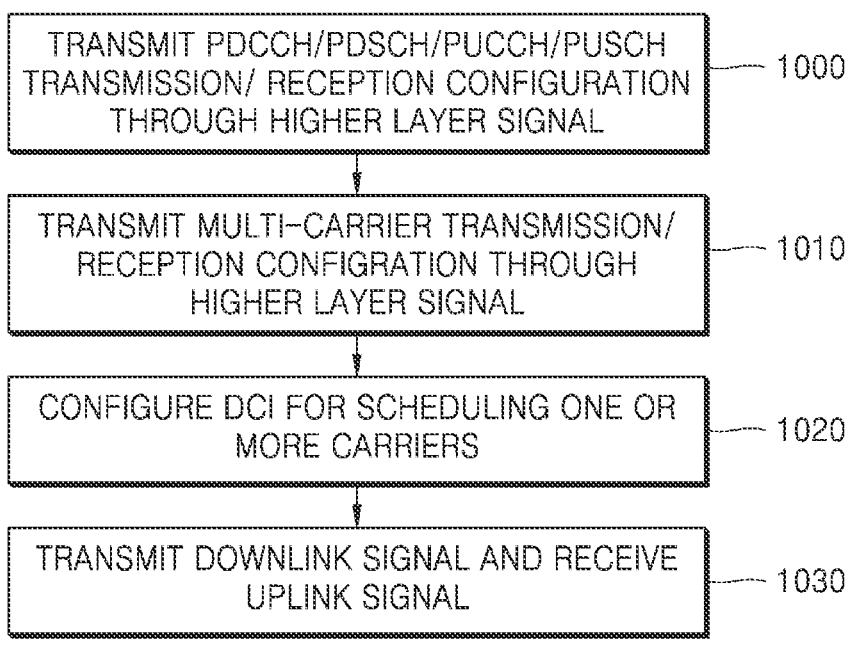
FIG. 10 is a flowchart illustrating an operation of a base station, according to embodiments of the disclosure.

An operation of a base station according to an embodiment of the disclosure will be described with reference to FIG. 10.

In operation 1000, a base station may transmit, to a UE, PDCCH, PDSCH, PUCCH, or PUSCH transmission/reception configuration through a higher layer signal. For example, the base station may transmit PDCCH resource region or CORESET configuration for receiving downlink or uplink scheduling information or search space configuration to the UE through a higher layer signal. Also, the base station may transmit PDSCH/PUSCH transmission/reception configuration including offset information between a PDCCH reception slot and a PDSCH reception slot or a PUSCH transmission slot, and PDSCH or PUSCH repeated transmission number information to the UE through a higher layer signal. Also, the base station may transmit interlace structure configuration and configuration of subcarrier interval information used for downlink reception or uplink transmission to the UE through a higher layer signal. In operation 1010, the base station may additionally transmit configuration information for cross-carrier or multi-carrier scheduling through one DCI. In this case, the information transmitted to the UE in operation 1010 may be transmitted in operation 1000. Also, the configuration information for cross-carrier and multi-carrier scheduling through one DCI may correspond to information transmitted through higher layer signaling to schedule a plurality of cells in Embodiments 1 through 5. In operation 1020, the base station may configure a DCI field for multi-carrier scheduling through one DCI, and may indicate the DCI to the UE. In operation 1030, the base station may transmit a downlink signal or may receive or decode an uplink signal from the UE based on the information configured by the base station in the UE.

Figure 11:
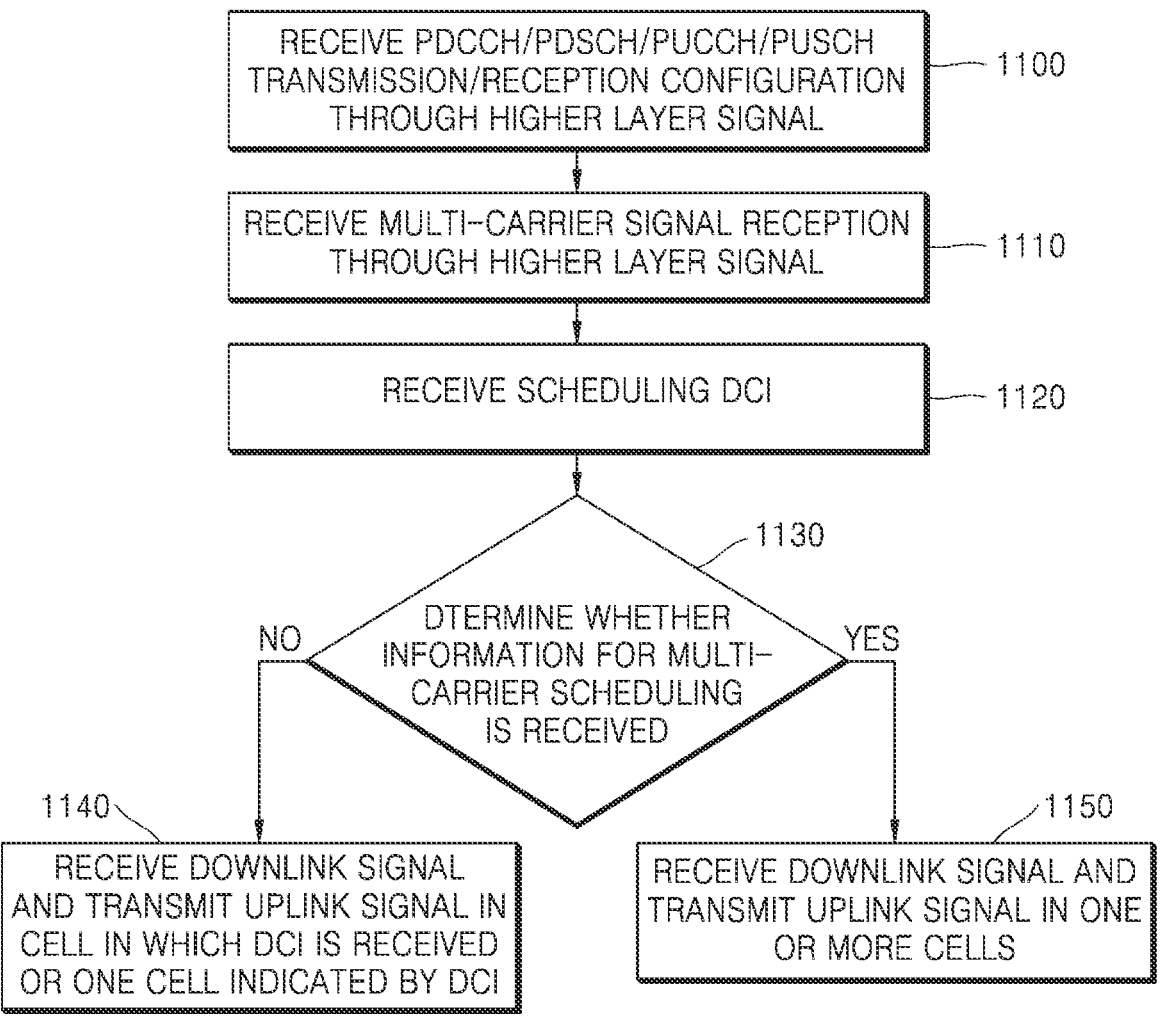
FIG. 11 is a flowchart illustrating an operation of a terminal, according to embodiments of the disclosure.

An operation of a UE according to an embodiment of the disclosure will be described with reference to FIG. 11.

In operation 1000, a UE receives, from a base station, PDCCH, PDSCH, PUCCH, or PUSCH transmission/reception configuration through a higher layer signal, and applies the PDCCH, PDSCH, PUCCH, or PUSCH transmission/reception configuration according to received configuration information. For example, the UE may receive PDCCH resource region or CORESET configuration for receiving downlink or uplink scheduling information or search space configuration from the base station through a higher layer signal. Also, the UE may receive interlace structure configuration and configuration of subcarrier interval information used for downlink reception or uplink transmission through a higher layer signal. In operation 1110, the UE may additionally receive configuration information for cross-carrier and multi-carrier scheduling through one DCI. Also, in this case, the configuration information for multi-carrier scheduling in operation 1110 may be included in the configuration information transmitted through a higher layer signal in operation 1100. Also, the configuration information for cross-carrier and multi-carrier scheduling through one DCI may correspond to information transmitted through higher layer signaling to schedule a plurality of cells in Embodiments 1 through 5. Ion operation 1120, the UE may receive DCI indicating downlink reception or uplink transmission from the base station. In operation 1130, when the received DCI includes information for scheduling multi-carriers at one time, the UE may receive a PDSCH or may transmit an uplink signal in one or more cells scheduled through the DCI. In operation 1130, when the received DCI indicates a cell in which the DCI is received or one cell indicated by the DCI, the UE may receive a downlink signal or may transmit an uplink signal in the cell.

Figure 12:
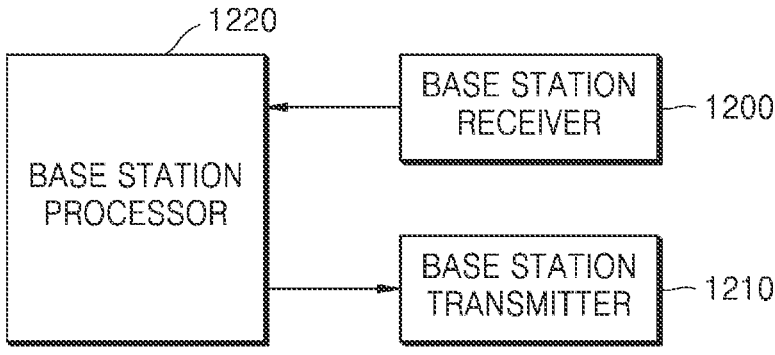
FIG. 12 is a block diagram illustrating a structure of a base station, according to embodiments of the disclosure.

FIG. 12 is a block diagram illustrating an internal structure of a base station, according to an embodiment of the disclosure.

As shown in FIG. 12, a base station of the disclosure may include a base station receiver 1200, a base station transmitter 1210, and a base station processor 1220. The base station receiver 1200 and the base station transmitter 1210 may be collectively referred to as a transceiver in an embodiment of the disclosure. The transceiver may transmit and receive a signal to and from a UE. The signal may include control information and data. For this, the transceiver may include a radio frequency (RF) transmitter for up-converting and amplifying a frequency of a transmitted signal and an RF receiver for low-noise amplifying and down-converting a frequency of a received signal. Also, the transceiver may receive a signal through a wireless channel and may output the signal to the base station processor 1220, and may transmit a signal output from the base station processor 1220 through the wireless channel. The base station processor 1220 may control a series of processes so that the base station operates according to the above embodiments of the disclosure. For example, the base station processor 1220 may configure or change DCI through which the base station may schedule multi-carriers at one time.

Figure 13:
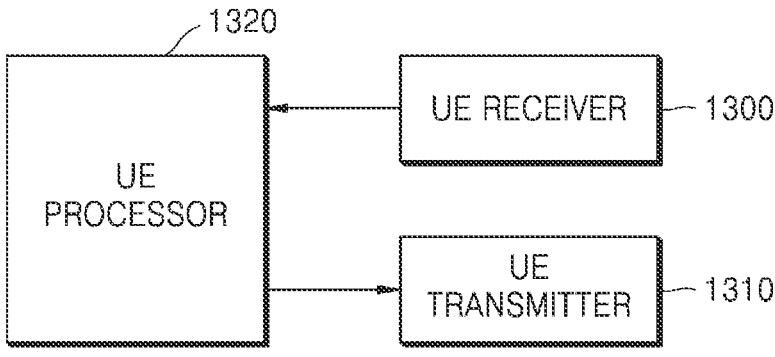
FIG. 13 is a block diagram illustrating a structure of a terminal, according to embodiments of the disclosure.

FIG. 13 is a block diagram illustrating an internal structure of a UE, according to an embodiment of the disclosure. As shown in FIG. 13, a UE of the disclosure may include a UE receiver 1300, a UE transmitter 1310, and a UE processor 1320. The UE receiver 1300 and the UE transmitter 1310 may be collectively referred to as a transceiver in an embodiment of the disclosure. The transceiver may transmit and receive a signal to and from a base station. The signal may include control information and data. To this end, the transceiver may include an RF transmitter for up-converting and amplifying a frequency of a transmitted signal and an RF receiver for low-noise amplifying and down-converting a frequency of a received signal. Also, the transceiver may receive a signal through a wireless channel and may output the signal to the UE processor 130, and may transmit a signal output from the UE processor 1320 through the wireless channel. The UE processor 1320 may control a series of processes so that the UE operates according to the above embodiments of the disclosure. For example, the UE receiver 1300 may receive a data signal including a control signal, and the UE processor 1320 may determine a reception result of the data signal. Next, at the timing, when a first signal reception result including the data reception is to be transmitted to the base station, the UE transmitter 1310 transmits the first signal reception result to the base station at a timing determined by the processor. In another example, the UE receiver 1300 may receive DCI and configuration for multi-carrier scheduling through one DCI from the base station. The UE processor 1320 may receive a downlink signal or may transmit an uplink signal at one time in multi-carriers based on the received DCI.

It should be understood that the embodiments of the disclosure in the specification and drawings should be considered in a descriptive sense only and not for purposes of limitation. Thus, it will be apparent to one of ordinary skill in the art that the disclosure is not limited to the embodiments of the disclosure described, which have been provided only for illustrative purposes. Also, the embodiments of the disclosure may be used in combination when necessary. For example, a first embodiment and a second embodiment may be combined and applied, or a part of the first embodiment and a part of the second embodiment may be combined and applied. Also, various modifications based on the technical concept of the embodiments may be applied to an LTE system, a 5G system, etc.

The invention claimed is:

1. A terminal for performing communication in a wireless communication system, the terminal comprising:
   a transceiver; and
   at least one processor coupled with the transceiver and configured to:
       transmit, to a base station, capability information indicating that the terminal can be scheduled in multiple cells,
       receive, from the base station, downlink control information (DCI) related with a plurality of cells scheduled for the terminal, and
       receive a physical downlink shared channel (PDSCH) through the plurality of cells,
   wherein the at least one processor is further configured to:
       obtain quasi co-located (QCL) time values of the plurality of cells, and
       in case that an interval between a symbol on which transmission of a physical downlink control channel (PDCCH) comprising the DCI ends and a start symbol of the PDSCH is equal to or less than a maximum value among the QCL time values, perform decoding of the PDSCH based on a transmission configuration indication (TCI) state indicated by a codepoint having a lowest value, among a plurality of TCI states activated through medium access control (MAC) control element (CE),
   wherein a plurality of codepoints for the plurality of cells and the plurality of TCI states activated through the MAC CE are mapped in an ascending order of codepoint values and TCI state identity (ID) values, and
   wherein the plurality of TCI states activated through the MAC CE is included in a TCI state list for each of the plurality of cells obtained at the terminal.

2. The terminal of claim 1, wherein the at least one processor is further configured to:
   in case that the received DCI has a DCI format indicated by a DCI field configured through a radio resource control (RRC) parameter or is scrambled with a preconfigured radio network temporary identity (RNTI), identify the plurality of cells based on the received DCI.

3. The terminal of claim 1, wherein the at least one processor is further configured to:

in case that information about a pre-configured number of cells is received, identify, as the plurality of cells scheduled for the terminal, a plurality of cells specified through a bitmap included in the DCI from among the pre-configured number of cells.

4. The terminal of claim 1, wherein the at least one processor is further configured to:

in case that information about a cell group including a plurality of cells is received, identify, as the plurality of cells scheduled for the terminal, a plurality of cells specified through a bitmap included in the DCI from among the plurality of cells included in the cell group.

5. The terminal of claim 1, wherein the at least one processor is further configured to:

when the PDSCH is scheduled in the plurality of cells, determine a lowest cell index from among cell indexes configured as cross-carriers as a carrier index for a search space.

6. The terminal of claim 1, wherein the at least one processor is further configured to:

identify a hybrid automatic repeat request (HARQ) process number included in the DCI; and determine the identified HARQ process number as an HARQ process number for a PDSCH transmitted on a cell on which the DCI is transmitted from among the plurality of cells.

7. A base station for performing communication in a wireless communication system, the base station comprising:

a transceiver; and at least one processor coupled with the transceiver and configured to:

receive, from a terminal, capability information indicating that the terminal can be scheduled in multiple cells, transmit, to the terminal, downlink control information (DCI) related with a plurality of cells scheduled for the terminal, and transmit a physical downlink shared channel (PDSCH) through the plurality of cells, wherein the at least one processor is further configured to:

transmit, to the terminal, quasi co-located (QCL) time values of the plurality of cells, wherein in case that an interval between a symbol on which transmission of a physical downlink control channel (PDCCH) comprising the DCI ends and a start symbol of the PDSCH is equal to or less than a maximum value among the QCL time values, decoding of the PDSCH is performed at the terminal, based on a transmission configuration indication (TCI) state indicated by a codepoint having a lowest value, among a plurality of TCI states activated through medium access control (MAC) control element (CE), wherein a plurality of codepoints for the plurality of cells and the plurality of TCI states activated through the MAC CE are mapped in an ascending order of codepoint values and TCI state identity (ID) values, and wherein the plurality of TCI states activated through the MAC CE is included in a TCI state list for each of the plurality of cells obtained at the terminal.

8. A method performed by a terminal in a wireless communication system, the method comprising:

transmitting, to a base station, capability information indicating that the terminal can be scheduled in multiple cells;

receiving, from the base station, downlink control information (DCI) related with a plurality of cells scheduled for the terminal; and receiving a physical downlink shared channel (PDSCH) through the plurality of cells, wherein the method further comprises:

obtaining quasi co-located (QCL) time values of the plurality of cells; and in case that an interval between a symbol on which transmission of a physical downlink control channel (PDCCH) comprising the DCI ends and a start symbol of the PDSCH is equal to or less than a maximum value among the QCL time values, performing decoding of the PDSCH based on a transmission configuration indication (TCI) state indicated by a codepoint having a lowest value, among a plurality of TCI states activated through medium access control (MAC) control element (CE), wherein a plurality of codepoints for the plurality of cells and the plurality of TCI states activated through the MAC CE are mapped in an ascending order of codepoint values and TCI state identity (ID) values, and wherein the plurality of TCI states activated through the MAC CE is included in a TCI state list for each of the plurality of cells obtained at the terminal.

9. A method performed by a base station in a wireless communication system, the method comprising:

receiving, from a terminal, capability information indicating that the terminal can be scheduled in multiple cells;

transmitting, to the terminal, downlink control information (DCI) related with a plurality of cells scheduled for the terminal; and transmitting a physical downlink shared channel (PDSCH) through the plurality of cells, wherein the method further comprises:

transmitting, to the terminal, quasi co-located (QCL) time values of the plurality of cells, wherein in case that an interval between a symbol on which transmission of a physical downlink control channel (PDCCH) comprising the DCI ends and a start symbol of the PDSCH is equal to or less than a maximum value among the QCL time values, decoding of the PDSCH is performed at the terminal, based on a transmission configuration indication (TCI) state indicated by a codepoint having a lowest value, among a plurality of TCI states activated through medium access control (MAC) control element (CE), wherein a plurality of codepoints for the plurality of cells and the plurality of TCI states activated through the MAC CE are mapped in an ascending order of codepoint values and TCI state identity (ID) values, and wherein the plurality of TCI states activated through the MAC CE is included in a TCI state list for each of the plurality of cells obtained at the terminal.

* * * * *